(12) United States Patent
Chen et al.

(10) Patent No.: US 11,470,623 B2
(45) Date of Patent: Oct. 11, 2022

(54) ELECTRONIC DEVICE, METHOD FOR WIRELESS COMMUNICATION SYSTEM AND STORAGE MEDIUM

(71) Applicant: SONY CORPORATION, Tokyo (JP)

(72) Inventors: Wei Chen, Beijing (CN); Xiaoyu Zhao, Beijing (CN); Xin Guo, Beijing (CN); Chen Sun, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/056,044

(22) PCT Filed: Jun. 12, 2019

(86) PCT No.: PCT/CN2019/090917
§ 371 (c)(1),
(2) Date: Nov. 17, 2020

(87) PCT Pub. No.: WO2019/238066
PCT Pub. Date: Dec. 19, 2019

(65) Prior Publication Data
US 2021/0219308 A1 Jul. 15, 2021

(30) Foreign Application Priority Data

Jun. 15, 2018 (CN) .......................... 201810618175.7

(51) Int. Cl.
*H04W 72/12* (2009.01)
*H04L 1/18* (2006.01)
(Continued)

(52) U.S. Cl.
CPC ......... *H04W 72/121* (2013.01); *H04L 1/1809* (2013.01); *H04W 4/08* (2013.01); *H04W 28/065* (2013.01)

(58) Field of Classification Search
CPC ... H04W 72/121; H04W 4/08; H04W 28/065; H04L 1/1809; H04L 1/08; H04L 1/189; H04L 2001/0093
See application file for complete search history.

(56) References Cited

U.S. PATENT DOCUMENTS

2008/0019263 A1* 1/2008 Stolpman .............. H04L 5/0037
370/210
2017/0142733 A1* 5/2017 Wang ................ H04W 72/0413

FOREIGN PATENT DOCUMENTS

CN 101515841 A 8/2009
CN 101695181 A 4/2010
(Continued)

OTHER PUBLICATIONS

International Search Report and Written Opinion dated Aug. 7, 2019 for PCT/CN2019/090917 filed on Jun. 12, 2019, 9 pages including English Translation of the International Search Report.

*Primary Examiner* — Mandish K Randhawa
(74) *Attorney, Agent, or Firm* — Xsensus, LLP

(57) ABSTRACT

The present disclosure relates to electronic device, method for a wireless communication system and storage medium. In an embodiment of the present disclosure, a plurality of terminal devices are grouped based on respective data configuration parameters of the plurality of terminal devices; and for each group, data packets for terminal devices in the group are integrated into a composite data packet to be sent to the terminal devices in the group.

12 Claims, 15 Drawing Sheets

(51) Int. Cl.
*H04W 4/08* (2009.01)
*H04W 28/06* (2009.01)

(56) References Cited

FOREIGN PATENT DOCUMENTS

| | | | |
|---|---|---|---|
| CN | 101754205 A | 6/2010 | |
| CN | 108632896 A | 10/2018 | |
| WO | 2017/197063 A1 | 11/2017 | |
| WO | WO-2020200452 A1 * | 10/2020 | ........... H04L 1/1887 |

* cited by examiner

ELECTRONIC DEVICE, METHOD FOR WIRELESS COMMUNICATION SYSTEM AND STORAGE MEDIUM

CROSS-REFERENCE TO RELATED APPLICATIONS

The present application is based on PCT filing PCT/CN2019/090917, filed Jun. 12, 2019, which claims priority to CN 201810618175.7, filed Jun. 15, 2018, the entire contents of each are incorporated herein by reference.

FIELD OF THE INVENTION

The present invention generally relates to a wireless communication system, and specifically relates to a communication technology in an ultra-reliable low-latency communication (URLLC) service.

BACKGROUND

With development of communication technology, requirements for reliability and latency in communication have increased. Ultra-reliable and low-latency communication (URLLC), which is one of three main application scenarios to be considered in the fifth-generation communication system, has increasingly got people's attention. For example, in the machine type communication (MTC), such as vehicle-to-vehicle (V2X), factory automation cases, point-to-point communication (P2P), wireless sensor network (WSN), etc., the ultra-reliable and low-latency communication (URLLC) service can be applied to meet the quality of service (QoS) requirement of the machine type communication.

Generally, URLLC in the machine type communication scenario is very different from that in other scenarios in that each transmitter uses a shorter data packet. Generally, given limited resources and bit error rates, the achievable maximum channel coding rate is related to the data packet length. In particular, for the same reliability requirement, in case data packets are sent at the same rate, each bit in a shorter data packet requires a larger average transmission resource. In addition, there is a trade-off between reliability and latency for short packet communication. On one hand, given the transmission resources, if shorter data packets are transmitted, the reliability requirement may not be met. On the other hand, if the packet length can meet the reliability requirement, the latency may exceed its requirement. Therefore, traditional short-packet communication often fails to meet both the latency and reliability requirements for URLLC scenarios in 5G.

SUMMARY OF THE INVENTION

In view of the above situation, the present disclosure proposes a solution for integrating short data packets into a composite data packet for transmission, so as to meet the requirements for both latency and reliability in URLLC.

The present disclosure provides electronic devices, methods, and storage medium for wireless communication systems.

An aspect of the present disclosure relates to an electronic device for a control-device-side of a wireless communication system. According to an embodiment, the electronic device comprises a processing circuit configured to: group a plurality of terminal devices based on respective data configuration parameters of the plurality of terminal devices; and for each group, integrate data packets for terminal devices in the group into a composite data packet to be sent to the terminal devices in the group.

Another aspect of the present disclosure relates to a method for a control-device-side of a wireless communication system. The method including: grouping a plurality of terminal devices based on respective data configuration parameters of the plurality of terminal devices; and for each group, integrating data packets for terminal devices in the group into a composite data packet to be sent to the terminal devices in the group.

Another aspect of the present disclosure relates to an electronic device for a terminal-device-side of a wireless communication system. The electronic device comprises a processing circuit configured to: receive a composite data packet, wherein the composite data packet is formed by integrating data packets for a group of terminal devices including the terminal device, the group of terminal devices being grouped based on data configuration parameters of the terminal devices; and decode the data for the terminal device from the received composite data packet.

Another aspect of the present disclosure relates to a method for a terminal-device-side of a wireless communication system. The method includes: receiving a composite data packet, wherein the composite data packet is formed by integrating data packets for a group of terminal devices including the terminal device, the group of terminal devices being grouped based on data configuration parameters of the terminal devices; and decoding the data for the terminal device from the received composite data packet.

Another aspect of the present disclosure relates to a non-transitory computer-readable storage medium storing executable instructions which, when executed, implement the methods as described hereinbefore.

Another aspect of the present disclosure relates to a device. The device includes a processor and a storage device, the storage device storing executable instructions which, when executed, implement the method as described hereinbefore.

Another aspect of the present disclosure relates to an apparatus that includes means for implementing the method as described hereinbefore.

The above content is provided to summarize some exemplary embodiments to provide a basic understanding of various aspects of the subject matter described herein. Therefore, the above-mentioned features are merely examples and should not be construed as narrowing the scope or spirit of the subject matter described herein in any way. Other features, aspects, and advantages of the subject matter described herein will become apparent from the following detailed description with reference to the accompanying drawings.

DESCRIPTION OF THE DRAWINGS

A better understanding of the present disclosure may be obtained when considering following detailed description of embodiments in conjunction with the accompanying drawings. The same or similar reference numerals are used in the drawings to indicate the same or similar components. Figures are included in the present specification together with the following detailed description and form a part of the specification, for illustrating the embodiments of the present disclosure and explaining principles and advantages of the present disclosure. Among them.

Figure 1:
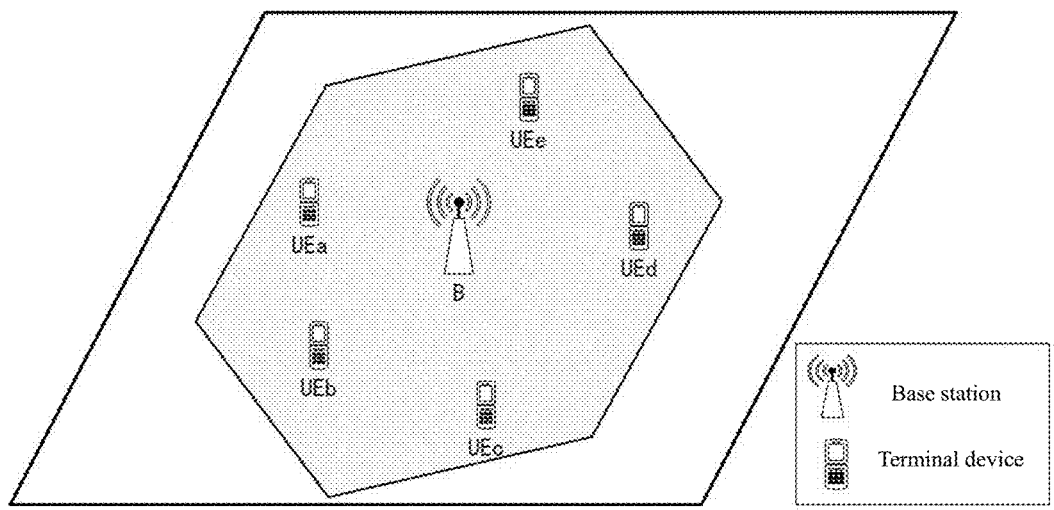
FIG. 1 schematically shows a communication system to which the present disclosure is applicable.

Although the embodiments described in this disclosure may be susceptible to various modifications and alternative forms, specific embodiments thereof are shown by way of example in the drawings and are described in detail herein. It should be understood, however, that the drawings and detailed description thereof are not intended to limit the embodiments to the particular forms disclosed, but on the contrary, the intention is to cover all modifications, equivalents, and alternatives falling within the spirit and scope of the claims. Program.

DETAILED DESCRIPTION OF PREFERRED EMBODIMENTS

Representative applications of various aspects of the device and method according to the present disclosure are described below. These examples are described only to enrich the context and to help to understand the described embodiments. Therefore, it is clear to those skilled in the art that the embodiments described below can be implemented without some or all of the specific details. In other cases, well-known process steps have not been described in detail in order to avoid unnecessarily obscuring the described embodiments. Other applications are possible, and the solutions of the present disclosure are not limited to these examples.

Typically, a wireless communication system includes at least a control device and a terminal device, and the control device provides communication services for one or more terminal devices.

In this disclosure, the term "base station" or "control device" has the full breadth of its usual meaning and includes at least wireless communication station that is used as a part of a wireless communication system or a radio system to facilitate communication. As an example, the base station may be, for example, an eNB in a 4G communication standard, a gNB in a 5G communication standard, a remote radio head, a wireless access point, a UAV control tower, or a communication apparatus performing similar functions. In the present disclosure, "base station" and "control device" can be used exchangedly, or "control device" can be implemented as a part of "base station". Application examples of the base station/control device will be described by taking the base station as an example in detail below with reference to the figures.

In this disclosure, the term "terminal device" or "user equipment (UE)" has the full breadth of its usual meaning and includes at least terminal device that is used as a part of a wireless communication system or a radio system to facilitate communication. As an example, the terminal device may be a terminal equipment such as a mobile phone, a laptop computer, a tablet computer, a vehicle on-board communication apparatus, or the like, or an element thereof. In the present disclosure, "terminal device" and "user equipment" (hereinafter will be simply referred to as "UE") can be used exchangedly, or "terminal device" can be implemented as a part of "user equipment". Application examples of the terminal device/UE will be described by taking the UE as an example in detail below.

In the present disclosure, the term "control device side"/"base station side" has the full breadth of its usual meaning, and generally indicates a side in the downlink of a communication system for transmitting data. Similarly, the term "terminal device side"/"user equipment side" has the full breadth of its usual meaning, and generally indicates a side in the downlink of a communication system for receiving data.

It should be noted that although the embodiments of the present disclosure are mainly described below based on a communication system including a base station and a user equipment, these descriptions can be correspondingly extended to a case of a communication system including any other type of control device side and terminal device side. For example, for the case of downlink, the operation at the control device side may correspond to the operation of the base station, and the operation at the user equipment side may correspond to the operation of the terminal device.

FIG. 1 schematically shows a communication system for a downlink communication scenario in a cell. The communication system is suitable for a high reliable and low latency communication service. As shown in FIG. 1, in this communication system, base station B for the terminal device/base station side will generate short data packets, and send the short data packets to corresponding URLLC users in multiple URLLC users UEa-UEe within a given latency as required. It should be noted that although five URLLC users are shown in the figure, the number of URLLC users is not limited to this.

In URLLC communication, there provides corresponding requirements for the control plane latency and user plane latency as well as reliability. According to the provisions of the 3GPP technical standard TS 38.913, regarding the latency: for the control plane, the latency does not exceed 10 milliseconds; for the user plane, the latencies in the uplink (UL) and downlink (DL) directions each does not exceed 1 milliseconds, in particular, the target of user plane latency should be UL 0.5 ms, DL 0.5 ms; regarding reliability, the probability of successfully transmitting a data packet with X bytes with a certain latency can be considered, in particular, in a case that the general reliability requirement for one transmission of one data packet is that for a 32-byte user plane, the latency is 1 ms, the probability of success is $1-10^{-5}$.

According to the technical standard TS 38.913, specific requirements for latency and reliability in URLLC are shown in Table 1:

TABLE 1

| Data packet size (Byte) | reliability | End-to End latency (ms) | Downlink latency (ms) | Uplink latency(ms) |
|---|---|---|---|---|
| 32 | $1 - 10^{-5}$ | 1 | 0.5 | 0.5 |

Among them, reliability is expressed as the probability of successfully transmitting a data packet of a certain size under a given latency.

Figure 2:
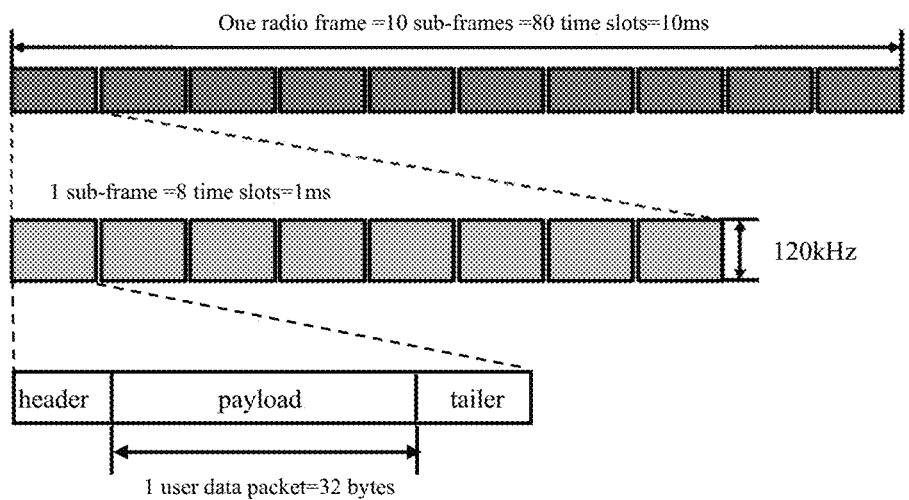
FIG. 2 schematically shows an existing frame structure.

In the downlink transmission, data packets are transmitted by using a conventional standard frame structure. As explained above, in traditional URLLC communication, short data packets are used for data transmission. The following will specifically adopt a frame structure with a configuration parameter Numberology=3 and analyze the specific performance. For example, in 5G communication, according to the provisions of the 3GPP technical standard TS 38.211, different values of Numberology correspond to different frame structures, such as the number of slots, the time per slot, the allocated bandwidth, and so on. In Numberology=3, the specific structure of the downlink frame is shown in FIG. 2: a radio frame includes 10 subframes; each subframe is 1 millisecond, including 8 time slots, and the bandwidth corresponding to each subframe is 120 kHz; each time slot is used to transmit 32-byte data packets (that is, short data packets) for a terminal device. Correspondingly, in the communication system of FIG. 1, the base station B generates respective 32-byte data packet and sends the data packets to each URLLC user within a given latency.

However, usage of short data packets for downlink transmission cannot simultaneously meet the latency and reliability requirements of URLLC. Next, for the case of Numberology=3, the latency and reliability of sending downlink data by using short data packets will be analyzed.

In a typical design, a physical resource is allocated for each data packet, and the data packet is encoded and transmitted. The encoded transmissions of data packets requested by different users are independent from each other.

Figure 3:
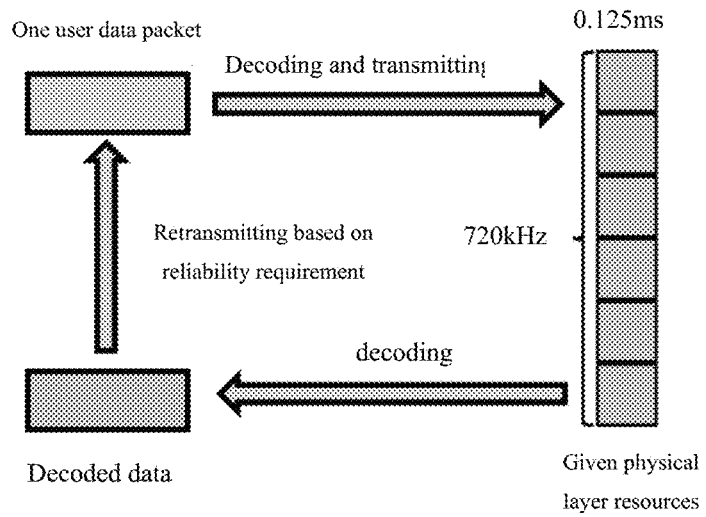
FIG. 3 schematically shows an existing data packet transmission process and resources occupied during the transmission.

Considering the data packet transmission process shown in FIG. 3. As shown in FIG. 3, the user data packets (each 32 bytes) are encoded independently from each other so as to be sent in one time slot (0.125 ms) of a subframe. It should be noted that "user data packets are encoded independently from each other" means that the encoded transmissions of data packets requested by different users are independent from each other. Considering the latency requirement, it is considered that a URLLC data packet transmission occurs within several time slots, that is to say, the successful transmission of user data packets is realized within several time slots. For the reliability requirement, retransmission is utilized to ensure reliability. It can be understood that the more the number of retransmissions is, the lower the bit error rate is, the higher the reliability is, while the longer the end-to-end downlink latency is. In addition, six frequency domain resource blocks are utilized to transmit 32-byte user data packets.

According to the known finite length coding theory, in this example, the bit error rate $\in^*(k,n)$ of a user data packet can be calculated by Formula 1:

$$\epsilon^*(k, n) \approx Q\left(\frac{nC - k + 0.5\log n}{\sqrt{nV}}\right) \quad \text{Formula 1}$$

in particular,

Q(•) is a q function, and its expression is $$Q(x) = \int_{x}^{+\infty} \frac{1}{\sqrt{2\pi}} \exp\left(-\frac{1}{2}t^2\right) dt;$$

n is the number of utilized channels, in this example, n=720 Khz×0.125 ms×2;

C is Shannon's formula, which represents a maximum transmission rate that can be achieved in an additive Gaussian white noise channel under a given signal-to-noise ratio ρ, which is expressed as C=½ $\log_2(1+\rho)$, where ρ is the signal-to-noise ratio, expressed as the ratio of average powers of the transmitted signal and the noise;

k is the number of bits in a user data packet, in this example, k=32×8;

$$V = \left(1 - \frac{1}{(1+\rho)^2}\right)(\log_2 e)^2$$

represents the effect of a finite length encoding on the maximum transmission rate achieved in Shannon's formula under a given signal-to-noise ratio ρ.

In addition, the reliability at the receiving end can be measured by the probability Pr of error-free transmission of a single user data packet, Pr can be calculated by Formula 2:

$$P_r = (1 - \in^*(k,n))^k \quad \text{Formula 2}$$

Therefore, the reliability and latency performance in this example are shown in Table 2, which shows the reliability and latency under different retransmission times.

TABLE 2

| Retransmission times | Reliability | Downlink latency (ms) |
|---|---|---|
| 0 | $1 - 4 \times 10^{-3}$ | 0.125 |
| 1 | $1 - 1.6 \times 10^{-5}$ | 0.375 |
| 2 | $1 - 6.6 \times 10^{-8}$ | 0.625 |

With reference to the requirements for reliability and downlink latency in Table 1, as shown in Table 2, in the existing downlink data transmission manners as shown in this example, it is impossible to meet the requirements of reliability and latency at the same time.

In view of this, the present disclosure proposes a new data packet integration scheme to simultaneously meet the reliability and latency requirements in URLLC.

Overview of the Disclosed Scheme

Different from the existing manner of independent encoding transmission of data packets, in the technical solution of the present disclosure, for data packets to be sent to multiple users, at least one data packet for at least one user may be integrated into a composite data packet for transmission. When a user terminal receives the composite data packet, it can decode the composite data packet to obtain the data packet for the user terminal.

Therefore, compared with the short data packets in the prior art, the composite data packet can have a longer length, so that a more appropriate frame structure can be used and resources can be allocated more appropriately during transmission, so that URLLC can better meet the requirements for reliability and latency.

The data packets contained in the composite data packet may all come from different terminal devices, or only duplicate data from the same terminal device, or a mixture of such two.

The composite data packet can be formed in consideration of different factors. For example, the composite data packet may be formed in consideration of data configuration parameters of the user equipment. The data configuration parameters may include data generation parameters, such as data generation period and data packet length, etc. Additionally or alternatively, the data configuration parameters may also include data transmission parameters, such as data transmission reliability requirements and data transmission latency requirements, etc. For example, the composite data packet may also be formed in consideration of the channel status between the user equipment and the base station. For example, by considering at least one of these parameters, a composite data packet can be formed from the user's data packets more appropriately. This will be described in more detail below.

The data packets for users contained in the composite data packet can be arranged in various ways. For example, the data packets for users may be arranged in order or out of order, and each data packet for each user may be divided into multiple sub-portions or not divided into multiple sub-portions, and the divided sub-portions may also be arranged in order or out of order. Different manners of arrangement can be adopted for different situations/requirements during transmission. This will be described in more detail below.

Figure 4:
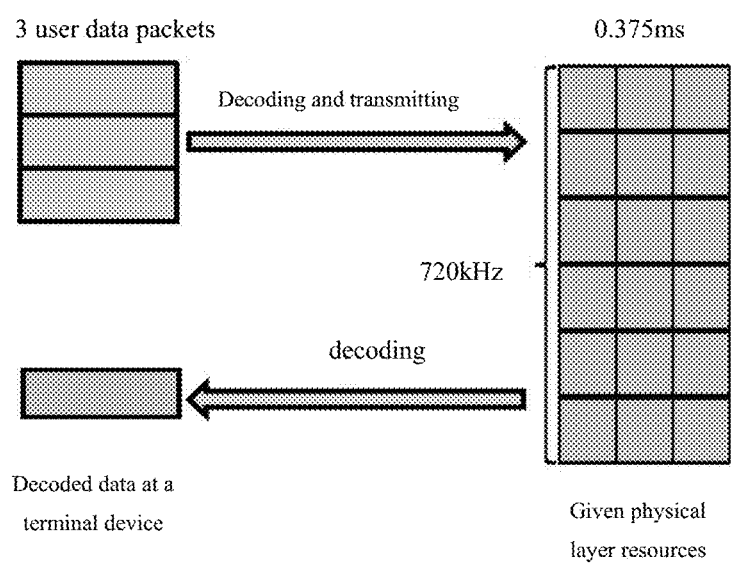
FIG. 4 schematically shows a data packet transmission process and resources occupied during the transmission according to the present disclosure.

Hereinafter, an exemplary composite data packet transmission process according to an embodiment of the present disclosure will be described with reference to FIG. 4. As shown in FIG. 4, a total of three data packets for three users are integrated by the base station into a composite data packet for encoding and transmission. The three users here may be users who are grouped into the same one user group according to their respective data configuration parameters, the grouping of users will be described in detail below. It should be noted that in this example, a total of 3 data packets for 3 users are shown, but this is only a non-limiting example. Any manner suitable for integrating multiple short data packets into a composite data packet is applicable, the number of data packets is not limited to 3, and the number of users is also not limited to 3. For example, a total of 4 data packets for 2 users can be integrated into a composite data packet for transmission. For another example, a total of 2 data packets for 1 user may be integrated into a composite data packet for transmission, wherein the data packets for the user may be the same or different from each other.

Continue to refer to FIG. 4, corresponding channel resources (physical layer resources) are allocated to transmit the encoded composite data packet. As shown in this example in a non-limiting manner, 3 time slots (i.e., 0.375 ms) and a bandwidth of 720 kHz are used to transmit the encoded composite data packet. Channel resources (physical layer resources) can be allocated according to the downlink channel status and data transmission configuration parameters (such as data transmission latency requirement and data transmission reliability requirement, etc.), and of course can also be allocated according to other parameters.

Continue to refer to FIG. 4, at the user side, that is, at the terminal device, the composite data packet is received and decoded. For simplicity, FIG. 4 only shows an operation example at one terminal device. The terminal device receives and decodes the composite data packet, extracts various parts for the terminal device from it, and reconstructs the original short data packet for the terminal device, thereby obtaining data for the terminal device. It should be pointed out that each part may be a complete original short data packet, or sub-portions into which the original short data packet is divided, or a combination of the two. It can be understood that, in the case where all parts for the terminal device are complete original short data packets, that is, when the composite data packet is formed, the base station does not divide the short data packet for the terminal device, the terminal device can directly decode the extracted short data packet to obtain data, without the step of reconstructing the short data packet.

For example, different ways can be further employed to meet the reliability requirement. For example, the base station can perform data retransmission to meet the reliability requirement. The data retransmission may be retransmission of the whole of the composite data packet, or the retransmission of a part of data in the composite data packet. Data retransmission can be performed periodically, for example, at predetermined intervals, or broadly speaking, as a way to meet the reliability requirement, data retransmission can include data duplication transmission, for example, during transmission of data, at least a part of data of the composite data packet can be transmitted multiple times in series repeatedly. The data retransmission may also be triggered, for example, in response to the request from the terminal device. This will be described in more detail below.

It should also be noted that during data transmission, the base station may also update the composite data packet periodically or in response to feedback from the terminal device, and transmit the updated composite data packet. The updating may include updating/changing the data contained in the composite data packet, for example, an updating corresponding to terminal devices corresponding to the composite data packet, such as adding of a new terminal device and/or deleting of the existing terminal device, and the composite data packet is updated accordingly. The updating may also include updating the arrangement of data contained in the composite data packet, for example, updating the division and/or arrangement of short data packets for the users, while the data contained in the composite data packet does not change. The updating of the composite data packet will be described in detail below.

Structure and Operation Flow of Base Station According to the Present Disclosure The conceptual structure of the base station according to the embodiment of the present disclosure will be explained below with reference to FIG. 5.

Figure 5:
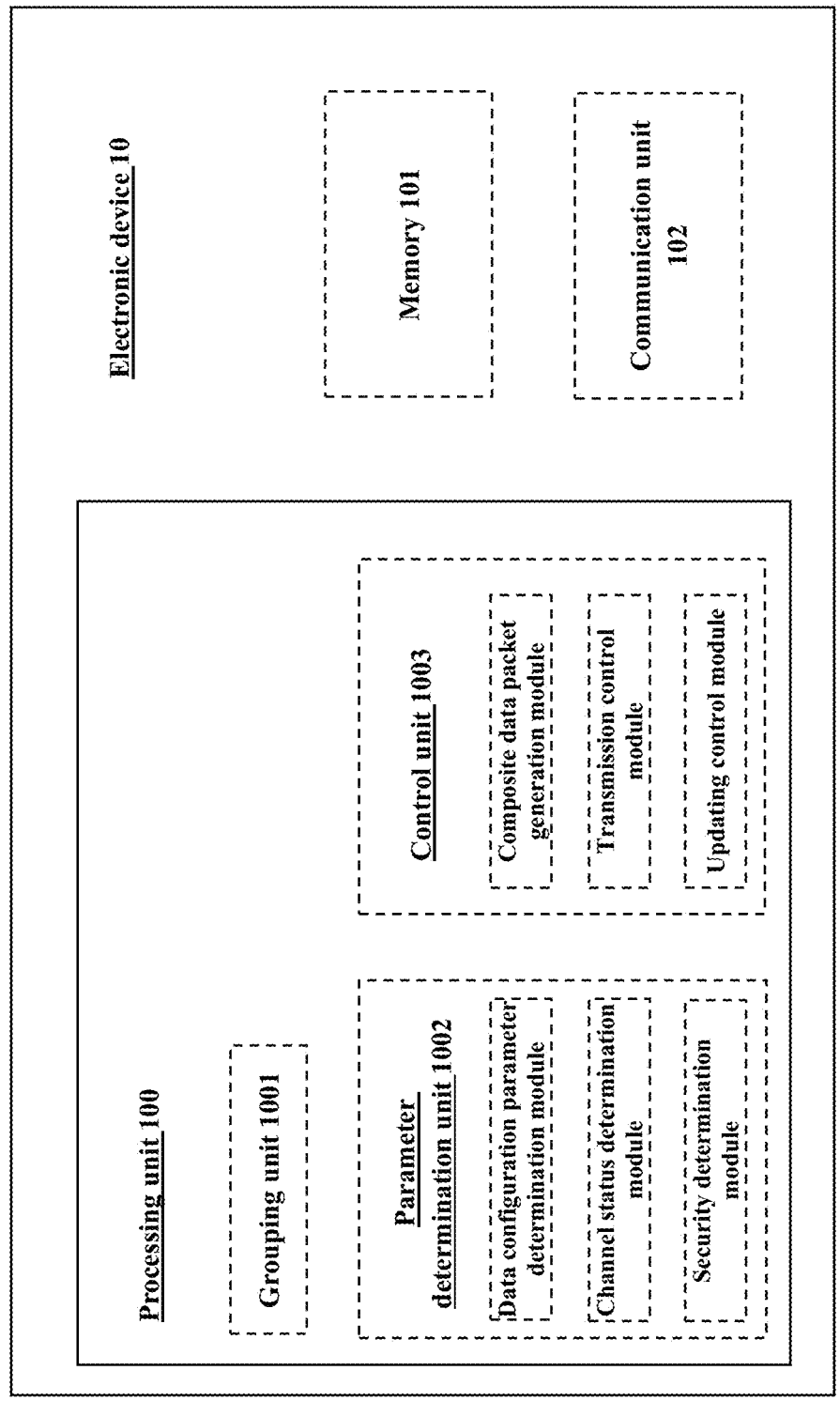
FIG. 5 schematically shows a conceptual configuration of an electronic device for a control-device-side according to an embodiment of the present disclosure.

As shown in FIG. 5, the electronic device 10 may include a processing circuit 100. The processing circuit 100 may be configured to group a plurality of terminal devices based on respective data configuration parameters of the plurality of terminal devices; and for each group, integrate data packets for terminal devices in the group into a composite data packet to be sent to the terminal devices in the group.

The processing circuit 100 may be in the form of a general-purpose processor, or may be a dedicated processing circuit, such as an ASIC. For example, the processing circuit 100 can be configured by a circuit (hardware) or a central processing device such as a central processing unit (CPU). In addition, the processing circuit 100 may carry a program (software) for operating the circuit (hardware) or the central processing device. The program can be stored in a memory (such as arranged in the memory 101) or an external storage medium connected from the outside, or downloaded via a network (such as the Internet).

In one embodiment, the processing circuit 100 may include a grouping unit 1001 that group a plurality of terminal devices based on respective data configuration parameters of the plurality of terminal devices. The processing circuit may further include a control unit 1003 for controlling generation and transmission of the composite data packet, which may be configured to, for each group, integrate data packets for terminal devices in the group into a composite data packet to be sent to the terminal devices in the group.

The processing circuit 100 may further include a parameter determination unit 1002 that determines various parameters. As an example, in implementation, depending on different parameters, the parameter determination unit 1002 may include a data configuration parameter determination module, a channel status determination module, a security determination module, etc., to measure or determine data configuration parameter, channel status and security, etc. for each terminal device. Alternatively, these parameter determination units may not be included in the processing circuit 100, and the parameters may be transmitted to the processing circuit 100 after the parameters have been determined. Alternatively, these parameters may be provided by a circuit other than the processing circuit 100 or even the electronic device 10.

The control unit 1003 may include a composite data packet generation module, which may integrate the data packets for the grouped terminal devices into a composite data packet. As an example, the module may divide or not divide the data packets for at least one terminal device, and integrate the divided sub-portions and/or data packets into a composite data packet. For example, the control unit 1003 may further include a transmission control module, which may implement a process of forming a composite data packet into a frame, and a process of allocating related resources for frame transmission. The transmission control module may also implement retransmission of the composite data packet.

For another example, the control unit 1003 may further include an updating control module which may, periodically or in response to the feedback from the terminal device, determine whether it is necessary to update the grouping or the composite packet structure, and if it is judged that the updating is needed, control the grouping unit 1001 or the composite data packet generation module to perform corresponding operations. In addition, the processing circuit 100 may further include an interface circuit (not shown) for interfacing between the units.

It should be noted that each of the above units is only a logical module classified according to the specific function it implements, instead of limiting its specific implementation manner, for example, it can be implemented in software, hardware, or a combination of software and hardware. In actual implementation, the foregoing units may be implemented as independent physical entities, or may be implemented by a single entity (for example, a processor (CPU or DSP, etc.), an integrated circuit, etc.). Furthermore, that the above units are indicated by dotted lines in the figure means such units need not to exist actually, while the operations/functions implemented by the units can be implemented by the processing circuit itself.

In addition, optionally, the electronic device 10 may further include a memory 101 and a communication unit 102 shown by dotted lines in the figure. In addition, the electronic device 10 may further include other components not shown, such as a radio frequency link, a baseband processing unit, a network interface, a processor, a controller, and the like. The processing circuit 100 may be associated with the memory 101 and/or the communication unit 102. For example, the processing circuit 100 may be directly or indirectly (for example, other components may be disposed therebetween) connected to the memory 101 for data access. Also for example, the processing circuit 100 may be directly or indirectly connected to the communication unit 102 to transmit radio signals via the communication unit 102 and receive radio signals via the communication unit 102.

The memory 101 may store various kinds of information generated by the processing circuit 100 (for example, information about composite data packet, information about the determined parameters, etc.), programs and data used for operation by the electronic device 10, data to be transmitted via the communication unit 102, and so on. The memory 101 is drawn with a dashed line because it can also be located inside the processing circuit 100 or even outside the electronic device 10. The memory 101 may be a volatile memory and/or a non-volatile memory, for example, the memory 101 may include, but not limited to, random access memory (RAM), dynamic random access memory (DRAM), static random access memory (SRAM), read-only memory (ROM), and flash memory.

The communication unit 102 may be configured to communicate with a terminal device under the control of the processing circuit 100. In one example, the communication unit 102 may be implemented as a transmitter or a transceiver, including communication components such as an antenna array and/or a radio frequency link, etc. In one embodiment, the communication unit 102 may transmit the composite data packet generated in the processing circuit 100 to the terminal device. In one embodiment, the communication unit 102 may also transmit and receive information for transmitting composite data packets.

Although it is shown in FIG. 5 that the processing circuit 100 is separated from the communication unit 102, the processing circuit 100 may also be implemented to include the communication unit 102. In addition, the processing circuit 100 may also be implemented to include one or more other components in the electronic device 10, or the processing circuit 100 may be implemented as the electronic device 10 itself. In an actual implementation, the processing circuit 100 may be implemented as a chip (such as an integrated circuit module including a single wafer), a hardware component, or a complete product.

The operations performed by the electronic device 10 will be described below with reference to FIGS. 6-10.

Figure 6:
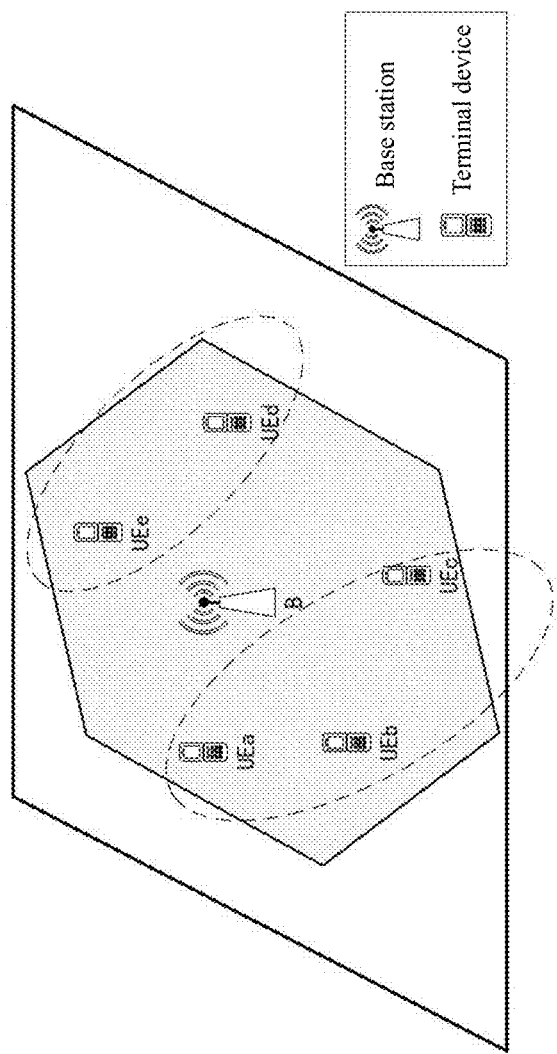
FIG. 6 schematically shows an example of grouping terminal devices according to an embodiment of the present disclosure.

FIG. 6 schematically shows an example of grouping terminal devices by the grouping unit 1001.

It should be understood that the grouping of terminal devices does not necessarily means grouping of all terminal devices, for example, it may be grouping of some terminal devices in all terminal devices. It should also be understood that a group of terminal devices may include one or more terminal devices. For example, a terminal device can also form a group, and in this case, for example, multiple data packets for the terminal device can be integrated into a composite data packet for transmission, or in the case of duplication transmission, the duplicate data packets for the terminal device constitute a composite data packet for transmission, as described in detail below.

In the downlink transmission, when there is data to be sent from the base station side to a certain terminal device, the terminal device is said to be active, that is, an active terminal device or an active user. The base station (for example, through the grouping unit 1001) may group the active users, for example, may group the active users into a group, and integrate the data packets for the active users into a composite data packet for transmission. Or, active users may be divided into multiple user groups, and for each group, the base station integrates the data packets for the users in the group into a composite data packet to be sent to the terminal devices in the group. As schematically shown in FIG. 6, the terminal devices UEa-UEe are all active terminal devices. The electronic device 10 of the base station B divides these terminal devices UEa-UEe into two groups, wherein the first group includes terminal devices UEa-UEc, and the second group includes terminal devices UEe and UEd. It should be pointed out that grouping can also be performed for some active terminal devices, instead of having to group all the active terminal devices.

Grouping can be implemented in various ways.

According to the embodiment, the grouping may be performed according to data configuration parameters of multiple terminal devices. The data configuration parameters may include, for example, a data generation configuration parameter, such as data generation period and data packet length. Additionally or alternatively, the data configuration parameters may include a data transmission configuration parameter, such as data transmission reliability requirement and data transmission latency requirement.

Preferably, the terminal devices are grouped based on similarity among the data configuration parameters. For example, a corresponding threshold can be set for the data configuration parameters, and the similarity of the data configuration parameters for the terminal devices can be determined according to the threshold. The specific threshold may be specified in advance, or may be adaptively specified according to the application environment and the like. It can be understood that setting the threshold is only a means to measure the similarity of the data generation configuration parameters. Those skilled in the art may select an appropriate threshold according to actual conditions, or determine the similarity of the data generation configuration parameters in other ways.

As an example, in the case of grouping based on the data generation configuration parameter, terminal devices with similar data generation configuration parameter are suitable to be grouped into the same group. For example, the data generation configuration parameters of the terminal devices (for example, data generation period and data packet length, etc.) can be compared and a threshold may be set for the comparison. When the difference between the data generation configuration parameters of different terminal devices is less than the threshold, the involved terminal devices can be grouped into the same group.

As an example, in the case of grouping based on the data transmission configuration parameter, terminal devices whose data transmission configuration parameter exceeds a certain threshold should not be grouped in the same group. As an example, terminal devices with high data transmission requirements are considered to have similar data transmission configuration parameters, and terminal devices with similar data transmission configuration parameters should not be grouped in the same group. For example, a threshold may be set, and terminal devices having data transmission configuration parameters exceeding the threshold (e.g., the transmission latency requirement is less than the latency requirement threshold, and/or the transmission reliability requirement is greater than the transmission reliability threshold) may be considered as terminal devices with high data transmission requirement, which belong to similar terminal devices, and such terminal devices will not be included in the same group. In addition, terminal devices whose data transmission configuration parameters do not exceed a certain threshold, such as terminal devices with transmission latency requirements greater than the latency requirement threshold and/or transmission reliability requirements less than the transmission reliability threshold, that is, terminal devices with low reliability and latency requirements, can be divided into the same group, and such terminal devices are considered to be dissimilar in terms of data transmission configuration parameters. It should be noted that setting the threshold is only a means to measure the reliability and latency requirements of the terminal device. Those skilled in the art can select an appropriate threshold according to the actual situation, or determine whether the reliability and latency requirements of the terminal device are high or not in other ways.

Additionally or alternatively, grouping can also be performed according to the channel status of a channel between the terminal device and the base station. The channel status may be determined by the base station side, may be determined by the terminal device side and notified to the base station, or may be determined by other devices and notified to the base station. The method for determining the channel status may adopt some methods commonly used in the art, and will not be described in detail here. The channel status can be indicated by various known indicators in the system, and will not be described in detail here.

Preferably, the terminal devices may be grouped based on the similarity of channel statuses. For example, terminal devices with similar channel statuses can be grouped into the same group. Here, the similarity may indicate the degree of difference or closeness between the channel statuses of the terminal devices. When the difference between the channel statuses of the terminal devices is less than a certain threshold, the channel statuses of the terminal devices may be considered to be similar, and such terminal devices may be grouped into the same group. The specific threshold may be specified in advance, or may be adaptively specified according to the application environment and the like. It can be understood that setting the threshold is only a means to measure the similarity of the channel statuses. Those skilled in the art may select an appropriate threshold according to actual conditions, or determine the similarity of the channel statuses in other ways.

As an example, the channel statuses (e.g., channel state indicator CQI, etc.) of the downlink channels between the base station and the terminal devices can be compared, and a threshold can be set for the comparison, when the difference between the channel statuses of different terminal devices is less than the threshold, the related terminal devices can be grouped into the same group.

The above various parameters for grouping are only examples, and other parameters can also be used, as long as grouping of terminal devices can be implemented based on the parameters. Moreover, the grouping can be implemented based on only one of the above-mentioned parameters, or based on more than one of the above-mentioned parameters. In the case of grouping based on more than one parameters, it may firstly perform grouping based on one parameter, and then if possible, continue to perform re-grouping based on another parameter, until the grouping meets the requirements. In this case, the parameters can be arbitrarily selected, or a priority can be set for each parameter, and the grouping can be performed based on the priorities. For example, the grouping may be firstly performed based on a high-priority parameter. If the grouping meets the requirement, the grouping will no longer be performed based on subsequent parameters. As an example, in the case of grouping based on more than one parameters, multiple parameters may also be synthesized to form a new parameter for reflecting the characteristics of the parameters, thereby the grouping is based on the new parameter. In this case, for example, it can calculate a corresponding score for each parameter according to its value (for example, through a normalization method, etc.), and calculate a new parameter from the scores corresponding to the parameters based on certain weights, and then group the terminal devices based on the newly calculated parameter.

According to the embodiment, the number of terminal devices in each packet may be different or the same, which may be determined by the control device according to various factors, such as the structure of the data transmission frame, the transmission requirements of the terminal devices, and so on. As an example, the number of terminal devices in each group may preferably be two. Of course, the number of terminal devices in each group may be more, or only one terminal device may be included in the group, and the composite data packet for the group may include multiple data packets for the terminal device and/or duplication of the data packets, in order to transmit the data for the terminal device more reliably.

In addition, grouping can be done in a static manner or can be dynamically updated. For example, the base station may group the terminal devices before transmitting the first composite data packet, and keep the grouping for a period of time. As in the example shown in FIG. 6, the electronic device 10 may group the five terminal devices UEa-UEe into two groups shown in the figure before transmitting a first composite data packet, and maintain this grouping so as to generate and send composite data packets for subsequent data transmission. For example, the base station may also update the packet periodically or in response to feedback from the terminal device. As in the example shown in FIG. 6, the electronic device 10 initially divides the terminal devices into two groups as shown in the figure. Subsequently, the electronic device 10 can dynamically update the grouping according to change of one or more of data generation configuration parameter, data transmission configuration parameter, and channel status of each terminal device, for example, grouping the terminal devices UEa and UEd into a group and grouping the terminal devices UEb, UEc and UEe into another group. For example, the dynamic updating of grouping may also correspond to updating of the terminal devices corresponding to the composite data packet, such as adding of a new terminal device and/or deleting of an existing terminal device.

After grouping the terminal devices, the terminal devices in the same group will be assigned the same group ID, and by means of such a group ID, the data packets for the terminal devices in the same group can be conveniently integrated into a composite data packet. Moreover, such a group ID can also distinguish active users from inactive users.

It should be noted that the relevant concepts and operations related to "grouping" are elaborated herein to facilitate easy understanding of the solution of the present disclosure. However, in practice, the base station can directly integrate the data packets for the terminal devices into a composite data packet without explicitly including the "grouping step". For example, after comparing the relevant parameters of the terminal devices as described above, the base station may directly assign labels to data packets for the terminal devices, and transmit the data packets assigned the same label directly as a composite data packet during transmission.

These parameters for grouping may be determined by the parameter determination unit 1002, for example, or provided by other circuits than the processing circuit, or even other devices other than the base station.

Figure 7:
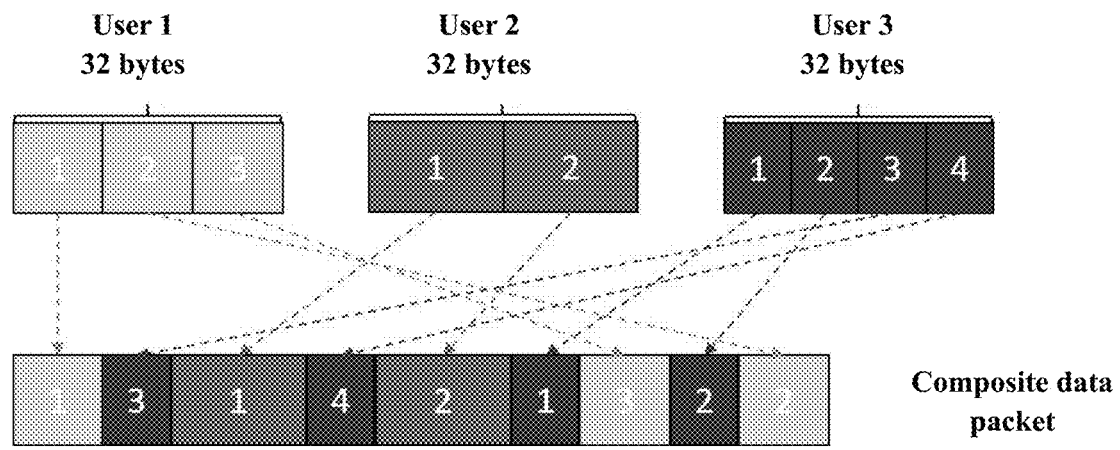
FIG. 7 schematically shows an exemplary structure of a composite data packet according to an embodiment of the present disclosure.
Figure 8:
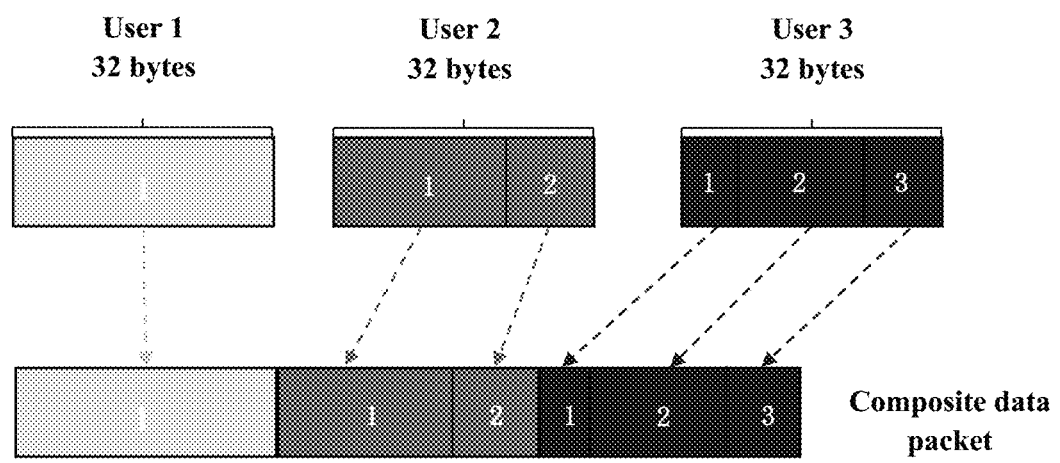
FIG. 8 schematically shows another exemplary structure of a composite data packet according to an embodiment of the present disclosure.

The composite data packet formed by data packets for the terminal devices will be described below. FIGS. 7 and 8 show exemplary structures of a composite data packet formed by the control unit 1003 integrating the data packets for terminal devices in the same group according to the grouping result of the grouping unit 1001.

The composite data packet for a group containing at least one terminal device includes at least one data packet for the at least one terminal device, and integrating multiple short data packets into a longer composite data packet aims to simultaneously meet the reliability and latency requirements of URLLC. It should be pointed out that, terminal devices in a group containing at least one terminal device whose data packets shall be included in a specific composite data packet can be determined according to a specific scheduling policy. For example, in a composite data packet, data packets for all terminal devices in the terminal device group associated with the composite data packet may not be included at the same time.

As shown in FIG. 7, a total of three data packets for three users are integrated into a composite data packet. Each user has a 32-byte data packet. Of course, the terminal device group may contain other numbers of terminal devices, and the composite data packet for the group may include data packets for each terminal device in the group.

Although FIG. 7 shows that in the composite data packet, there is one data packet per terminal device, according to some examples, the composite data packet may include multiple data packets for the same terminal device, and the contents of at least some of the multiple data packets can be consistent (for example, in the case where there is duplication transmission of data). In the case where a composite data packet includes multiple data packets for the same terminal device, if the terminal device has a higher latency requirement, the composite data packet may include multiple different data packets for the terminal device, thereby transmitting the multiple different data packets in the form of a composite data packet; if the terminal device has a higher reliability requirement, the composite data packet may include copies of the same data packet for the terminal device, that is, using the composite data packet to perform duplication transmission of the same data packet for the device.

In addition, the composite data packet may also include both multiple data packets for the same terminal device and one or more data packets for one or more other terminal devices. As an example, the composite data packet may contain multiple data packets for only one terminal device.

According to an example, with respect to a composite data packet for a group of terminal devices, the data packet for at least one terminal device among the terminal devices in the group is divided into a plurality of sub-portions. The number of sub-portions obtained by dividing the data packet for each terminal device may be the same or different. Moreover, as an example, in a composite data packet, a plurality of divided sub-portions may be arranged sequentially or dispersedly.

As shown in FIG. 7, the data packet for user 1 is divided into 3 sub-portions, the data packet for user 2 is divided into 2 sub-portions, and the data packet for user 3 is divided into 4 sub-portions. However, the manner of dividing the data packet as shown in FIG. 7 is merely exemplary, and each data packet constituting the composite data packet does not necessarily undergo such division. As shown in FIG. 8, the data packet for user 1 is not divided, but directly constitutes a sub-part of the composite data packet. In some embodiments, all the sub-parts that make up the composite data packet are all complete data packets.

In addition, the lengths of the sub-portions into which the end user's data packets are divided may be the same or different. FIG. 7 shows a case where user data packets are evenly divided, as shown, for example, the data packet for user 3 is evenly divided into 4 sub-portions of equal lengths. FIG. 8 shows a case where the user data packet is non-uniformly divided, for example, the data packet for user 3 is non-uniformly divided into three sub-portions of unequal lengths.

Referring again to FIG. 7, in a composite data packet composed of 3 data packets for 3 users, the divided sub-portions are arranged in a dispersive manner, that is, the various sub-portions are arranged in an irrelevant manner randomly and dispersedly so that the sub-portions from different data packet are arranged out of order. It can be understood that the dispersive arrangement of the sub-portions can be implemented through various proper ordering manners (for example, a non-random manner complying with a certain rule). In addition, the arrangement manner of the sub-portions as shown in FIG. 7 is merely exemplary, and the sub-portions may also be arranged in the composite data packet sequentially, as shown in FIG. 8.

The division and ordering of data packets can be done in many ways. For example, the division and/or ordering of data packets for the terminal device may be performed according to at least one of the data transmission configuration parameter of the terminal device and the data security of the terminal device.

On one hand, the division of data packets can be based on user latency and reliability requirements and/or based on user security requirement. In particular:

Consideration of Data Transmission Configuration Parameter of Terminal Device

Under this consideration, meeting the user reliability and latency requirements shall be considered preferentially. Specifically, the longer the data packet is, or the stronger the latency and reliability constraints are, the data packet may not be divided or will be divided into fewer sub-portions. In addition, as an example, the length of each sub-portion can be kept the same. For example, in a case where the lengths of the sub-portions are consistent, it is only necessary to notify the terminal device of the position indication and length indication of each sub-portion in the composite data packet during transmission, which can save transmission overhead, and in this way, can also reduce the time for the base station side generating the composite data packet and the time for the terminal device side reconstructing the composite data packet.

Considerations of Data Security of Terminal Device

Under this consideration, the main concern is the user's privacy requirement. Specifically, the higher the user's privacy requirement is, the more the sub-portions are divided, and different sub-portions can set different lengths. This is mainly for the purpose that, for example, it is not easy for other terminal devices at the receiving side to reconstruct the data packet for a user with high privacy requirement, thereby preventing the data for the user from being stolen by other terminal devices.

On the other hand, the sub-portions into which the data packet for the terminal device is divided may be arranged according to at least one of the data transmission configuration parameter and the data security of the terminal device. That is to say, the ordering of the sub-portions can be based on user latency and reliability requirements and/or based on user security requirement. In particular:

Consideration of Latency and Reliability Requirements of Terminal Device

If the terminal device has high latency and reliability requirements, in the process of arranging the sub-portions, the sub-portions shall be ordered in a sequential manner as much as possible so as to reduce the time to reconstruct the data packet at the terminal device.

Considerations of Data Security of Terminal Device

If the terminal device has high privacy requirement, in the process of arranging the sub-portions, it is preferable to generate a composite data packet in which the sub-portions are ordered dispersedly in a complicated ordering manner.

It shall be understood that for any of the division of data packet or the arrangement of divided sub-portions, the trade-off between the user's requirements for reliability and latency and the requirement for data security shall be taken into consideration. In practice, a person skilled in the art can select appropriate division and ordering manners according to the above criteria.

After the processes of dividing the data packet and integrating the composite data packet, for each terminal device, a corresponding structure indicator can be given. The structure indicator indicates the position and length occupied by the terminal device's data packet or its divided sub-portions in the composite data packet corresponding to the terminal device. For example, the structure indicator may include position indices of the data packets/sub-portions of data packets of each terminal device in the composite data packet and sizes of the data packets/sub-portions of data packets. For example, if the lengths of the sub-portions are the same, the structure indicator may include only the position indices of the sub-portions in the composite data packet and the size of a single sub-portion. Therefore, the terminal device can extract the data portions for the terminal device from the received composite data packet according to the structure indicator, and if necessary (for example, the data packet is divided into multiple sub-portions), reconstruct the data packet according to the position and length indicated by the structure indicator.

Figure 9:
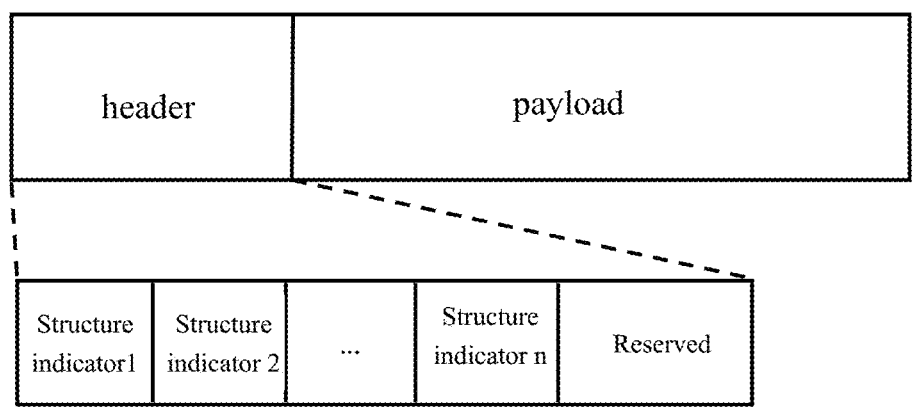
FIG. 9 schematically shows an exemplary structure of a header of a composite data packet according to an embodiment of the present disclosure.

The structure indicator may be sent together with the corresponding composite data packet, and the structure indicator sent together with the composite data packet includes a structure indicator for each of the terminal devices corresponding to the composite data packet. This manner is generally applicable to the situation where the user corresponding to each structure indicator has low security requirement or does not require privacy. For example, as shown in FIG. 9, the structure indicator may be sent, as the header of the composite data packet, to the terminal device together with the payload portion of the composite data packet. As shown in FIG. 9, the header portion of the composite data packet may include structure indicators for the terminal devices 1, 2 . . . n, so as to notify each of the terminal devices 1, 2 . . . n corresponding to the composite data packet of the position and occupied length of a respective data packet or the sub-portions into which the data packet is divided in the composite data packet. It can be understood that, by way of non-limiting example only, it is illustrated that the structure indicator and the composite data packet are transmitted together while including the structure indicator in the header of the composite data packet. In practice, other variant implementations in which structure indicators are sent together with the composite data packet can also be applied.

The structure indicator can also be sent to the corresponding terminal device separately from the composite data packet. This method is generally applicable to the situation where the user corresponding to the structure indicator has high security requirement or has privacy requirement. That is to say, when the user does not want other users in the same group to know the position and occupied length of the user's data packet or the sub-portions into which the data packet is divided in the composite data packet while receiving the composite data packet, the structure indicator can be sent to the user separately. For example, the structure indicator may be transmitted together with scheduling information through PDCCH. It can be understood that other suitable control signaling can also be used to send the structure indicator.

The structure of the composite data packet has been explained above with reference to FIGS. 7-9. It should be pointed out that the configuration of the composite data packet structure can be static or dynamic.

(1) Static composite data packet structure: After the base station completes the construction of the composite data packet (including division and arrangement of the data packets) for the first time, in the subsequent transmission process of data packets for the terminal devices in the group, the structure of the composite data packet firstly constructed will remain unchanged. For example, referring to the example shown in FIG. 7, when constructing a composite data packet for the first time, the data packet for user 1 is divided into 3 equal-length sub-portions, the data packet for user 2 is divided into 2 equal-length sub-portions, the data packet for user 3 is divided into 4 equal-length sub-portions, and the sub-portions are arranged in the order of user 1 sub-portion 1, user 3 sub-portion 3, user 2 sub-portion 1, user 3 sub-portion 4, user 2 sub-portion 2, user 3 sub-portion 1, user 1 sub-portion 3, user 3 sub-portion 2 and user 1 sub-portion 2. In this way, in the static mode, for subsequent data packets for user 1, user 2, and user 3, a subsequent new composite data packet will be generated according to the composite data packet structure firstly constructed.

(2) Dynamic composite data packet structure: After the base station completes the construction of the composite data packet (including division and arrangement of the data packets) for the first time, in the subsequent transmission process of data packets for the terminal devices in the group, the structure of the subsequent composite data packet can be dynamically updated in accordance with timing triggering or triggering based on feedback from the terminal device. For example, a base station (such as the control unit 1003 of the processing circuit 100) can dynamically update the structure of the composite data packet in accordance with change of one or more of the data transmission configuration parameter (that is, the terminal device's requirements for reliability and latency) and data security requirement of each terminal device.

According to an embodiment, the updating of the composite data packet structure may include updating of the division and/or arrangement of the data packets for the terminal devices in the composite data packet. As an example, the arrangement of data contained in the composite data packet may be updated, for example, the division and/or arrangement of the short data packets for users may be updated, while the data contained in the composite data packet does not change.

With reference to the above description about the updating of the grouping, as an example, the updating of the composite data packet may include the updating of corresponding terminal devices (i.e., the updating of the grouping) alone, or include the updating of the division and/or arrangement of the data packets for terminal devices in the composite data packet (i.e., the updating of the composite data packet structure) alone, or may include both the updating of corresponding terminal devices and the updating of the division and/or arrangement of the data packets for terminal devices in the composite data packet.

After the composite data packet is formed, the composite data packet can be sent from the control device side to the terminal device side. According to the embodiment, the channel resources may be allocated for the composite data packet to transmit the composite data packet. As an example, the allocation of channel resources may be based on the channel status of the terminal device, as well as the data transmission configuration parameter.

According to some embodiments of the present disclosure, the base station (such as the processing circuit 100, or the transmission control module in the control unit 1003) performs euniform encoding and modulation sprocess on the generated composite data packets. Based on the channel statuses of the terminal devices and the data transmission configuration parameters, channel resources are allocated for the composite data packet, wherein the allocation of channel resources depends on each user's CQI as well as reliability and latency requirements. Specifically, the higher the reliability and latency requirements of the users corresponding to the composite data packet are, the more channel resources are allocated, and frequency bands with smaller channel fading are selected according to the CQI.

According to some embodiments of the present disclosure, composite data packets generated for different groups constitute a data frame. As an example, the selection process for a specific frame structure may refer to the corresponding 3GPP NR standard, or an appropriate frame structure can be selected according to the application environment.

The structure indicator as described above can be transmitted together with the composite data packet via the allocated channel resources. As an alternative, in a case where the structural indicators are sent separately, resources can be separately allocated to such structural indicators for the transmission thereof, and such allocation and transmission can use common methods and manners in the art, which will not be described in detail here.

In the following, the manner of guaranteeing reliability of the composite data packet will be explained.

In order to ensure that the user can meet the reliability requirement even when the user cannot successfully decode and reconstruct the corresponding data packet from the received composite data packet, the present disclosure proposes retransmission of the composite data packet. Retransmission of the composite data packet can be implemented in a variety of ways.

According to an embodiment, data retransmission may be performed periodically or in response to a request from a terminal device.

According to the embodiment, in a broad sense, the retransmission of the composite data packet may be performed by means of retransmission or duplication. According to an embodiment, the retransmission may include retransmitting the previously generated composite data packet or part of the data contained therein periodically, such as at predetermined intervals, or in response to a request from the terminal device. The duplication may include, in one composite data packet transmission, repeatedly transmitting the generated composite data packet or part of the data contained therein, which may be repeated two or more times.

According to some embodiments, the electronic device 10 may retransmit the data periodically (for example, if the acknowledgement response Ack is not received within a given time) or in response to a request from the terminal device, thereby retransmitting the data to a terminal device that unsuccessfully receives or decodes the data packet. The terminal device that unsuccessfully receives or decodes the data packet may refer to a terminal device from the base station does not receive acknowledgement response Ack within a given time, or may refer to a terminal device that made the request.

Specifically, data retransmission can be performed in one of the following ways:

(1) Retransmit the previously generated composite data packet. In this method, the base station does not modify the composite data packet associated with the unsuccessfully received data, and retransmits it to the terminal device that has unsuccessfully decoded and reconstructed the corresponding data packet. In other words, the base station sends the previously generated composite data packet as it is to the terminal device that does not successfully receive the data. Therefore, in this way, the base station does not need to reconfigure the structure indicator, frame structure configuration and resource allocation, etc. for the composite data packet. It should be noted that, in this retransmission mode, as an alternative, the base station may also send the previously generated composite data packet that needs to be retransmitted to all terminal devices in a group of terminal devices associated with the composite data packet. In this case, for example, when receiving the retransmitted composite data packet, the terminal device can determine whether the composite data packet has been successfully received and decoded. If the composite data packet has been indeed successfully decoded and received, no operation is performed on the retransmitted composite data packet, for example, the retransmitted composite data packet can be directly discarded.

(2) Retransmit a new composite data packet, which is re-integrated by a data packet related to a specific data packet in the previously generated composite data packet, wherein the specific data packet is the data packet for a terminal device in the previously generated composite data packet which has not been successfully received. In this way, the base station will reconstruct a new composite data packet based on the data packet in the previously generated composite data packet that has not been successfully received. Therefore, in this way, because the structure of the retransmitted composite data packet has changed, it is necessary to reconfigure the composite data packet structure indicator, frame structure configuration and resource allocation, and interact with the corresponding user to notify the updated configuration.

(3) Retransmit a specific data packet individually, wherein the specific data packet is a data packet for a terminal device in the previously generated composite data packet that has not been successfully received. In this way, the base station will encode and modulate the unsuccessfully received data packet individually and transmit it on the allocated resources. That is to say, this retransmission manner can use a traditional short packet transmission method to retransmit the unsuccessfully received data packet.

According to some embodiments, the data retransmission manner can be selected based on at least one of the data transmission configuration parameter of the terminal device and the channel status of the terminal device. Specifically, if the current channel is poor or there are a large number of users in the group who have not successfully received the data packets, the manner of retransmitting the previously generated composite data packet can be chosen; if the user has a higher requirement for the reliability of the data packet but the requirement for latency is loose, or if the number of users in the group who have not successfully received the data packet is small, the manner of retransmitting a new composite data packet can be chosen; if the user has a higher latency requirement, the manner of retransmitting the specific data packet individually can be employed.

As an example, if the configuration parameter and status information of the terminal device itself have not changed, the control device/base station may only perform data retransmission for the terminal device as described above. Or, as an example, if the configuration parameter and/or status information of the terminal device itself have changed, the terminal device may send the current configuration parameter and/or status information of the terminal device, etc., to the control device while requesting retransmission, or simply send the changed configuration parameter and/or status information, etc. to the control device/base station, so that the control device/base station may update the composite data packet while the retransmission is performed, and send the updated composite data packet to the terminal device, thereby achieving both updating and retransmission. As an example, in the case where both updating and retransmission are implemented at the same time, the retransmission manner and the like may also be selected with reference to information such as updated configuration parameter and/or status information.

According to some embodiments, the electronic device 10 may trigger data duplication transmission (which may also be referred to as repeat transmission) in response to the request from the terminal device or in any other way to ensure reliability. As an example, the electronic device 10 may perform data duplication transmission for all terminal devices, or a specific terminal device, or a requesting terminal device. As an example, the duplication transmission may be performed every time the base station performs composite data packet transmission, and in this regard, it also belongs to periodic retransmission in a broad sense. For example, after the generated composite data packet has been transmitted, the duplication transmission may repeatedly send the composite data packet, or repeatedly send another composite data packet or specific data packet in the composite data packet. As an example, the base station side may refer to the historical records of previous communications, or feedback from the terminal device, or the setting in the communication system of the terminal device, etc., to perform data duplication transmission for the terminal device, for example, the data duplication transmission can be performed for a terminal device with high reliability requirement or a terminal device for which more errors happen in the previous transmission.

Specifically, data duplication transmission can be performed in one of the following ways:

(1) Duplication transmission of the previously generated composite data packet. In this manner, after generating the composite data packet to be duplicate transmitted, the base station repeatedly sends it to the terminal device as it is. Therefore, in this way, the base station does not need to reconfigure the structure indicator, frame structure configuration, resource allocation, etc. for the composite data packet to be delicately transmitted.

(2) Duplication transmission of a new composite data packet. The new composite data packet may be re-integrated from data packet related to a specific data packet in the previously generated composite data packet (for example, a data packet requested to be duplicate transmitted or a data packet requiring high reliability). For example, after having transmitted the already generated composite data packet, the new composite data packet may be repeatedly sent.

Moreover, in this way, since the structure of the duplicate transmitted composite data packet has changed, it is necessary to reconfigure the structure indicator, frame structure configuration and resource allocation for the composite data packet to be duplicate transmitted, and interact with the corresponding users to notify the updated configuration.

(3) Individual duplication transmission of a specific data packet, wherein the specific data packet is, for example, a data packet requested to be duplicate transmitted or a data packet requiring high reliability. For example, after having transmitted the already generated composite data packet, the specific data packet may be repeatedly sent.

In this way, the base station will encode and modulate the specific data packet individually, and duplicate transmit it on the allocated resources.

According to some embodiments, the manner of duplication transmission is selected based on at least one of the data transmission configuration parameter of the terminal device and the channel status of the terminal device. Specifically, the user can choose different manners of duplication transmission according to the reliability and latency requirements of the data packet and the channel status. If the current channel is poor or the number of users in the group who have not successfully received the data packet is large, the manner of duplication transmission of the previously generated composite data packet can be selected; if the user has a higher requirement for the reliability of the data packet but a loose requirement for latency, or the number of users in the group who have not successfully received the data packet is small, the manner of duplication transmission of a new composite data packet can be selected; if the user has a higher requirement for latency, the manner of individual duplication transmission of the specific data packet can be selected.

Next, the conceptual operation flow of the base station will be explained with reference to FIG. 10.

The operation of the base station starts from step S100.

At S101, the base station groups a plurality of terminal devices based on respective data configuration parameters of the plurality of terminal devices. For example, the base station can group the terminal devices based on similarity among the data configuration parameters of the terminal devices. The data configuration parameter of a terminal device can comprise a data generation configuration parameter of the terminal device, and, a difference among the data generation configuration parameters of terminal devices which are grouped into a same group is smaller than a particular threshold. The data generation configuration parameter comprises at least one of a data generation period and a data packet length. The data configuration parameter of a terminal device can further comprise a data transmission configuration parameter, and terminal devices whose data transmission configuration parameters exceed a particular threshold are not included in a same group. The data transmission configuration parameter comprises at least one of a data transmission reliability requirement and a data transmission latency requirement. For example, the base station can further group the terminal devices based on channel statuses (such as, channel status indicator CQI) of the terminal devices, and a difference among the channel statuses of terminal devices being grouped in a same group is smaller than a particular threshold.

After the grouping of the terminal devices is completed, the operation proceeds to step S102. In step S102, the base station integrates data packets for terminal devices in a group into a composite data packet to be sent to the terminal devices in the group. The composite data packet for the group of terminal devices includes at least one data packet for at least one terminal device. In some embodiments, for each group of terminal devices, the base station can divide data packets for at least one of the terminal devices in the group into a plurality of sub-portions, and in the composite data packet for the group, the divided plurality of sub-portions are arranged sequentially or dispersedly. The data packet for a terminal device is divided according to at least one of a data transmission configuration parameter and a data security of the terminal device.

In addition, in step S102, the base station may also generate a structure indicator for each terminal device involved in the generated composite data packet, the structure indicator indicating the position and length occupied by the terminal device's data packet or its divided sub-portions in the composite data packet corresponding to the terminal device.

As an example, steps S101 and S102 can also be combined into a single step. For example, when the base station determines the terminal devices whose data packets will be sent together based on data configuration parameters of multiple terminal devices, the base station directly assigns the same ID to the data packets for these terminal devices, and the data packets for the terminal devices assigned the same ID will be sent together as a composite data packet.

Subsequently, the operation of the base station proceeds to step S103. At step S103, the base station may allocate channel resources for the composite data packet based on the channel statuses and the data transmission configuration parameters of the terminal devices, and can select an appropriate frame structure to transmit the composite data packet, for example, select the frame structure based on related standards in 3GPP. In addition, in step S103, the base station may also send a composite data packet structure indicator corresponding to a terminal device to the terminal device. For example, the base station may send structure indicators to the terminal device together with the corresponding composite data packet, and the structure indicators sent together with the composite data packet includes a structure indicator for each of the terminal devices corresponding to the composite data packet. For example, the base station can also transmit the structure indicator and the composite data packet separately to the corresponding terminal device, and in the case of separate transmission, the transmission of the structure indicator can be performed before or after the transmission of the composite data packet, or it can be performed simultaneously with the transmission of the composite data packet but via different resources.

As an example, in the case where the composite data packet is transmitted separately from the structure indicator, the structure indicator may be generated and transmitted after the composite data packet has been generated and transmitted.

Subsequently, the transmission process of the base station proceeds to step S104. At step S104, the base station may judge whether the data needs to be retransmitted periodically or in response to the data retransmission trigger from the terminal device. If it is judged at step S104 that the data need not be retransmitted, the transmission process ends at step S106. If it is judged at step S104 that data needs to be retransmitted, the base station receives reference information related to the retransmission at step S105, and select an appropriate manner of retransmission for data retransmission according to these reference information (such as the transmission configuration parameter and channel status of the terminal device, etc.). For example, data retransmission can be performed in one of the following ways: retransmit the previously generated composite data packet; retransmit a new composite data packet, which is re-integrated from the data packets related to specific data packets in the previously generated composite data packet; and retransmit specific data packets individually, wherein the specific data packets can be data packets for the terminal devices in the previously generated composite data packet which are not successfully received. In particular, when the base station chooses to retransmit a new composite data packet, it may provide the terminal device with a structure indicator for the corresponding new composite data packet.

Also for example, in order to ensure reliability, the operation on the base station side may further include the step of data duplication transmission as described above in detail. The data duplication transmission may be included in the retransmission step 104, or as an alternative or supplementary for the retransmission step S104.

Figure 10:
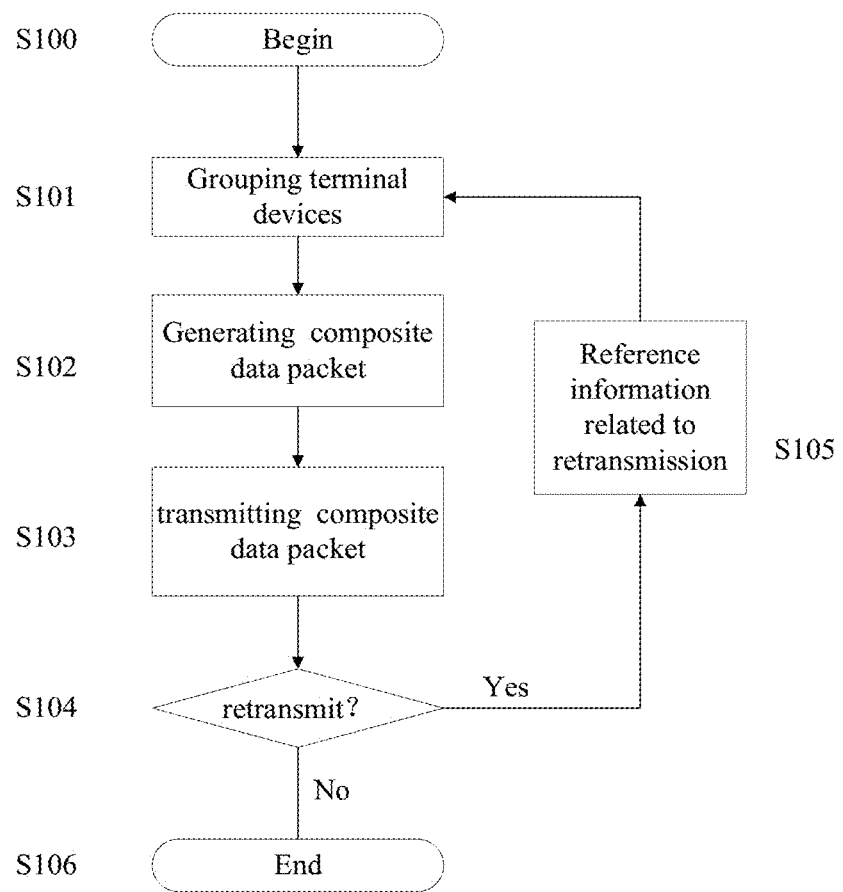
FIG. 10 schematically shows a conceptual operation flow at the control-device-side according to an embodiment of the present disclosure.

It should be noted that the operation steps of the base station shown in FIG. 10 are only schematic. In practice, the operation on the base station side may also include some additional or alternative steps. For example, in anywhere between step S101 to step S105, a step of updating the composite data packet periodically or in response to feedback from the terminal device may also be included. The updating includes updating of terminal devices corresponding to the composite data packet (that is, the updating of terminal device grouping as described above) and/or updating of the division and/or arrangement of the data packet for the terminal device in the composite data packet (that is, updating of the composite data packet structure as explained above).

Structure and Operation Flow of a Terminal Device According to the Present Disclosure The exemplary structure and exemplary operation of the base station according to the present disclosure have been described in detail above. Next, an exemplary structure and an exemplary operation flow of a terminal device according to the present disclosure will be explained with reference to FIGS. 11-12.

First, the conceptual structure of the electronic device 20 for a terminal device/user device according to an embodiment of the present disclosure will be explained with reference to FIG. 11.

Figure 11:
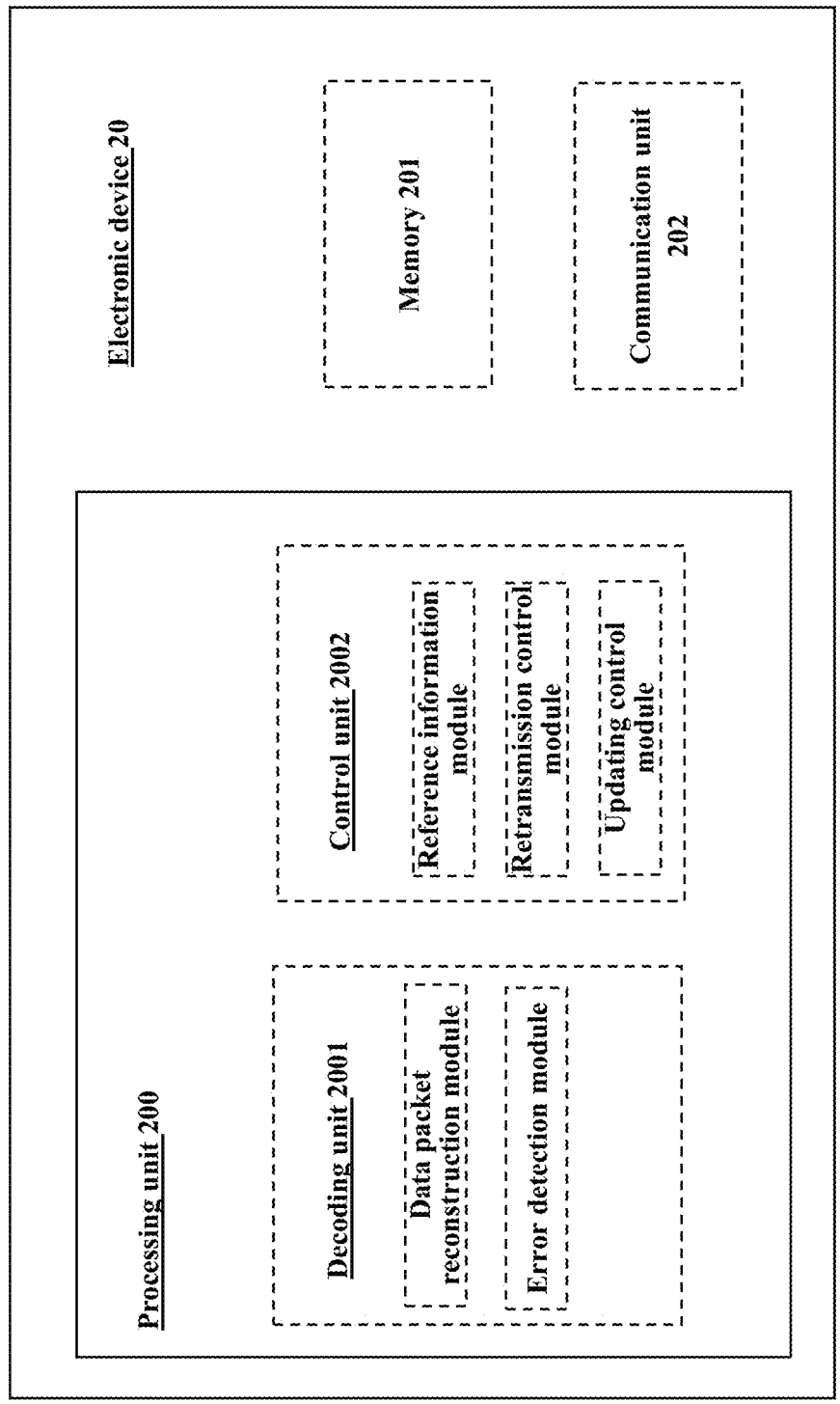
FIG. 11 schematically shows a conceptual configuration of a terminal device according to an embodiment of the present disclosure.

As shown in FIG. 11, the electronic device 20 may include a processing circuit 200. The processing circuit 200 may be configured to receive a composite data packet, wherein the composite data packet is formed by integrating data packets for a group of terminal devices including the terminal device, the group of terminal devices being grouped according to data configuration parameters of the terminal devices; and decode data for the terminal device from the received composite data packet. Among them, the generation and transmission of the composite data packet may be performed as described above, and will not be described in detail here.

In addition, optionally, the electronic device 20 may further include a memory 201 and a communication unit 202 shown by dotted lines in the figure. In addition, the electronic device 20 may also include other components not shown, such as a radio frequency link, a baseband processing unit, a network interface, a processor, a controller, a display, and the like. The processing circuit 200 may be associated with the memory 201 and/or the communication unit 202. For example, the processing circuit 200 may be directly or indirectly (for example, other components may be disposed therebetween) connected to the memory 201 for data access. Also for example, the processing circuit 200 may be directly or indirectly connected to the communication unit 202 to transmit radio signals via the communication unit 202 and receive radio signals via the communication unit 202.

The memory 201 may store various information generated by the processing circuit 200 (for example, information about data configuration parameters of the electronic device 20, channel status information, etc.), programs and data for the operation of the electronic device 20, data to be transmitted by the communication unit 202, etc. The memory 201 is drawn with a dotted line because it can also be located inside the processing circuit 200 or outside the electronic device 20. The memory 201 may be a volatile memory and/or a non-volatile memory. For example, the memory 201 may include, but is not limited to, random access memory (RAM), dynamic random access memory (DRAM), static random access memory (SRAM), read only memory (ROM), and flash memory.

The communication unit 202 may be configured to communicate with the base station under the control of the processing circuit 200. In one example, the communication unit 202 may be implemented as a transmitter or a transceiver, including communication components such as an antenna array and/or a radio frequency link. In one embodiment, the communication unit 202 can receive a composite data packet sent by the base station. In one embodiment, the communication unit 202 may also send reference information about the transmission of the composite data packet and retransmission request, etc.

The processing circuit 200 may be in the form of a general-purpose processor or a dedicated processing circuit, such as an ASIC. For example, the processing circuit 200 can be constructed by a circuit (hardware) or a central processing device such as a central processing unit (CPU). In addition, the processing circuit 200 may carry a program (software) for operating the circuit (hardware) or a central processing device. The program can be stored in a memory (such as arranged in the memory 201) or an external storage medium connected from the outside, and downloaded via a network (such as the Internet).

Although it is shown in FIG. 11 that the processing circuit 200 is separated from the communication unit 202, the processing circuit 200 may also be implemented to include the communication unit 202. In addition, the processing circuit 20 may also be implemented to include one or more other components in the electronic device 20, or the processing circuit 200 may be implemented as the electronic device 20 itself. In actual implementation, the processing circuit 200 may be implemented as a chip (such as an integrated circuit module including a single wafer), a hardware component, or a complete product.

In one embodiment, the processing circuit 200 may include a decoding unit 2001 that decodes data for a terminal device from the received data packet (especially a composite data packet). It should be noted that the structure and related features of the composite data packet have been described above, and will not be repeated here for simplicity. The decoding unit 2001 may extract the data packet and/or sub-portions of the data packet for the terminal device from the received composite data packet according to the structure indicators of the composite data packet. The decoding unit 2001 may further, for example, a data packet reconstruction module that reconstructs the sub-portions into a data packet for the terminal device according to the structure indicators of the composite data packet. The decoding unit 2001 can also decode the data for the terminal device from the (possibly reconstructed) data packet. The decoding unit 2001 may also include an error detection module that detects and corrects, if possible, errors in the decoded data.

The processing circuit 200 may further include a control unit 2002. The control unit 2002 controls transmission related to data packets (especially composite data packets). The control unit 2002 may include a reference information module that generates information to be related to the transmission of the composite data packet and control the transmission of the information to the base station via the communication unit 202. The reference information may be, for example, the channel status, positioning, latency requirement, security requirement and so on of the terminal device. The control unit 2002 may also include a retransmission control module. The retransmission control module may be associated with an error detection module. For example, when the error detection module detects data error, the retransmission control module may generate a retransmission request and control the transmission of the retransmission request to the base station via the communication unit 202. The data retransmission has been described in detail above, and will not be repeated here for simplicity. The processing circuit 200 may also include an updating control module. The updating control module may, for example, control whether an updating request for the composite data packet needs to be sent to the base station according to change of the reference information generated in the reference information module. The updating of the composite data packet has been described in detail above, and will not be repeated here for simplicity. In addition, the processing circuit 200 may further include an interface circuit (not shown) for interfacing between the units.

It should be noted that the above units are only logical modules divided according to the specific functions implemented by them, rather than limiting specific implementation modes, for example, they can be implemented in software, hardware, or a combination of software and hardware. In actual implementation, the above units may be implemented as independent physical entities, or may be implemented by a single entity (for example, a processor (CPU or DSP, etc.), an integrated circuit, etc.). In addition, the above-mentioned units are shown by dotted lines in the drawings to indicate that these units may not actually exist, and the operations/functions they implement can be realized by the processing circuit itself.

Next, an exemplary operation flow of the terminal device will be explained with reference to FIG. 12.

The exemplary operation of the terminal device starts from step S200. At step S201, the terminal device receives a composite data packet, wherein the composite data packet is formed by integrating data packets for a group of terminal devices including the terminal device, group of terminal devices are grouped according to data configuration parameters of the terminal devices. The terminal devices can be grouped based on similarity between the data configuration parameters of the terminal devices. The data configuration parameter of the terminal device can comprise a data generation configuration parameter of the terminal device, and, a difference among the data generation configuration parameters of terminal devices which are grouped into a same group is smaller than a particular threshold. The data generation configuration parameter may comprise at least one of a data generation period and a data packet length. The data configuration parameter of the terminal device can further comprise a data transmission configuration parameter, and terminal devices whose data transmission configuration parameters exceed a particular threshold are not included in a same group. The data transmission configuration parameter can further comprise at least one of a data transmission reliability requirement and a data transmission latency requirement. The terminal devices can further be grouped based on channel statuses of the terminal devices, and a difference among the channel statuses of terminal devices being grouped in a same group is smaller than a particular threshold.

In addition, it should be noted that the data packet for the terminal device in the composite data packet can be divided into a plurality of sub-portions, and the divided plurality of sub-portions are arranged sequentially or dispersedly. The data packet for the terminal device can be divided according to at least one of a data transmission configuration parameter and a data security of the terminal device.

In step S201, it is also possible to receive a composite packet structure indicator corresponding to the terminal device while receiving the composite data packet, the structure indicator indicating the position and length occupied by the terminal device's data packet or its divided sub-portions in the composite data packet corresponding to the terminal device. Alternatively, the operation of the terminal device can comprise the step of receiving the composite packet structure indicator after or before the step S201, and in such a case, the structure indicator is transmitted separately from the composite data packet.

After the composite data packet and the corresponding structure indicator have been received, the operation of the terminal device proceeds to step S202. In step S202, the terminal device decodes the data. Among them, the terminal device extracts one or more sub-portions for the terminal device from the composite data packet according to the position and length indicated by the structure indicator. If the structure indicator indicates only one sub-portion, the extracted portion is a complete data packet for the terminal device, and the data packet can be directly decoded to obtain data. If the structure indicator indicates multiple sub-portions, step S202 further includes a sub-step of reconstructing the data packet from the sub-portions according to the structure indicator. The terminal device can decode the reconstructed data packet to obtain data.

Subsequently, the operation of the terminal device proceeds to step S203. In step S203, the terminal device detects the decoded data. In addition, if the received data packet cannot be successfully decoded and reconstructed, it can also be considered that an error is detected.

If an error is detected, for example, a retransmission request and corresponding reference information can be sent to the base station at step S205. And at step S206, the retransmitted data is received, and the retransmitted data may include at least one of the following: the previously generated composite data packet; a new composite data packet, which is re-integrated from the data packets related to specific data packets in the previously generated composite data packet; specific data packets in the previously generated composite data packet. The retransmitted data can be selected based on at least one of a data transmission configuration parameter of the terminal device and a channel status of the terminal device. The specific data packets are, for example, data packets for the terminal device in the previous composite data packet that have not been successfully received. In addition, at the same time as or before or after the step S206 of receiving the new composite data packet, the terminal device may also receive a corresponding new composite data packet structure indicator similar to the operation in step S201. Moreover, although not shown, the received retransmitted data may still be decoded and/or reconstructed as that in step S202, and will continue to undergo the processing of step S203 and thereafter.

It should be pointed out that the trigger of retransmission can also be based on the acknowledgement response Ack. For example, when no error is detected at step S203, the terminal device may send an Ack confirmation response to the base station, otherwise, the terminal device does not send any message or send a NACK response to the base station, thereby triggering retransmission.

In the case where no error is detected at step S203, the terminal device detects whether the transmission latency is exceeded at S204. If the transmission latency is indeed exceeded, the operation proceeds to S205 to send a retransmission request.

Otherwise, if no error is detected and the transmission latency is not exceeded, the terminal device will determine that the data was successfully received, and the operation ends at step S207.

Figure 12:
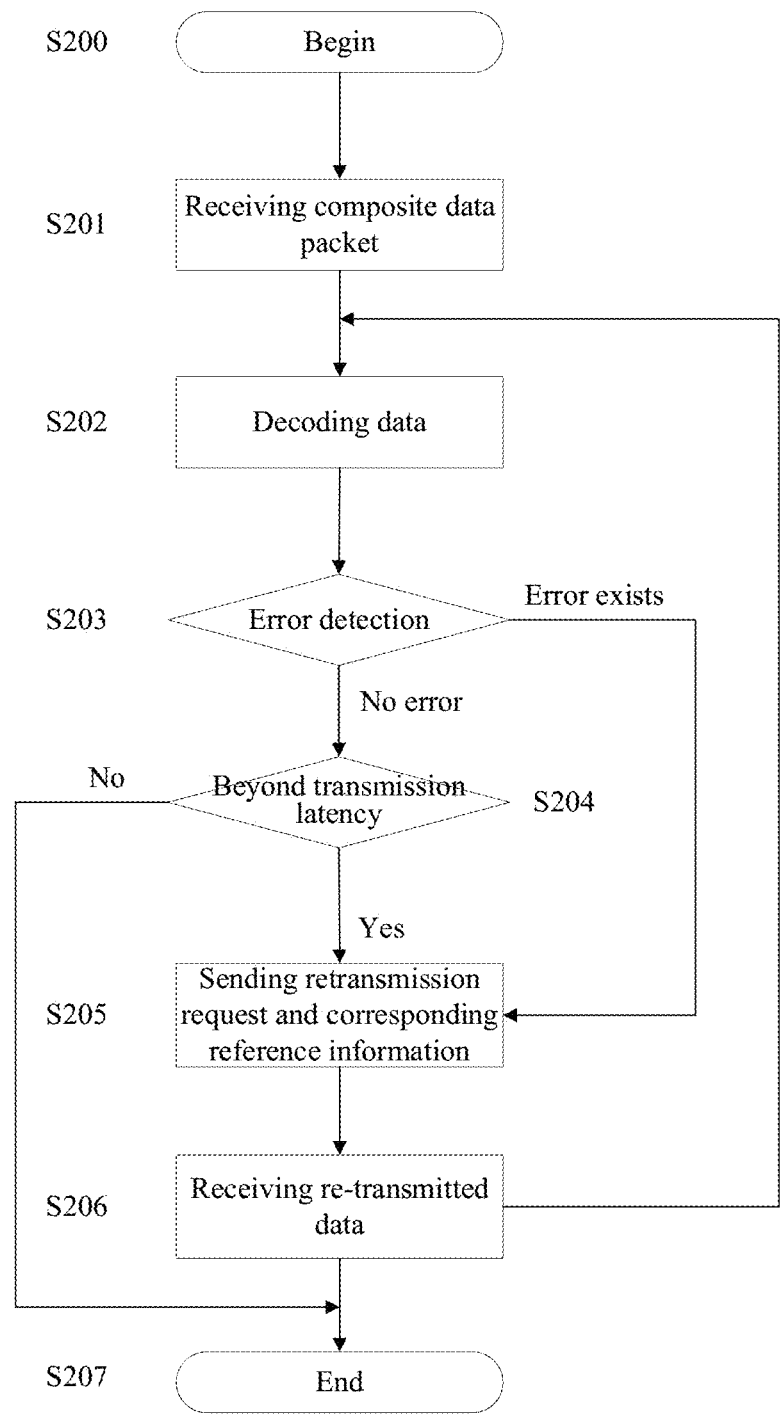
FIG. 12 schematically shows a conceptual operation flow at the terminal-device-side according to an embodiment of the present disclosure.

It should be noted that the operation steps of the base station shown in FIG. 12 are only schematic. In practice, the operation on the terminal device side may also include some additional or alternative steps. For example, in anywhere between step S201 to step S205, a step of sending a request for updating the composite data packet periodically or in response to change (such as, change of data configuration parameters and change of channel status, etc.) of the terminal device may also be included. The updating includes updating of terminal devices corresponding to the composite data packet (that is, the updating of terminal device grouping as described above) and updating of the division and/or arrangement of the data packet for the terminal device in the composite data packet (that is, updating of the composite data packet structure as explained above). Also for example, in order to ensure reliability, the operation on the terminal device side may further include receiving the duplicate-transmitted data at step S201 (duplication transmission of data has been described in detail above). In the case of receiving duplicate-transmitted data, step S205 of sending a retransmission request may not be performed.

Signaling Flow Between Base Station and Terminal Device

The schematic configuration and operation flow of the base station and the terminal device have been explained above with reference to the figures. Next, the signaling flow between the base station and the terminal device according to the present disclosure will be explained with reference to FIG. 13.

Figure 13:
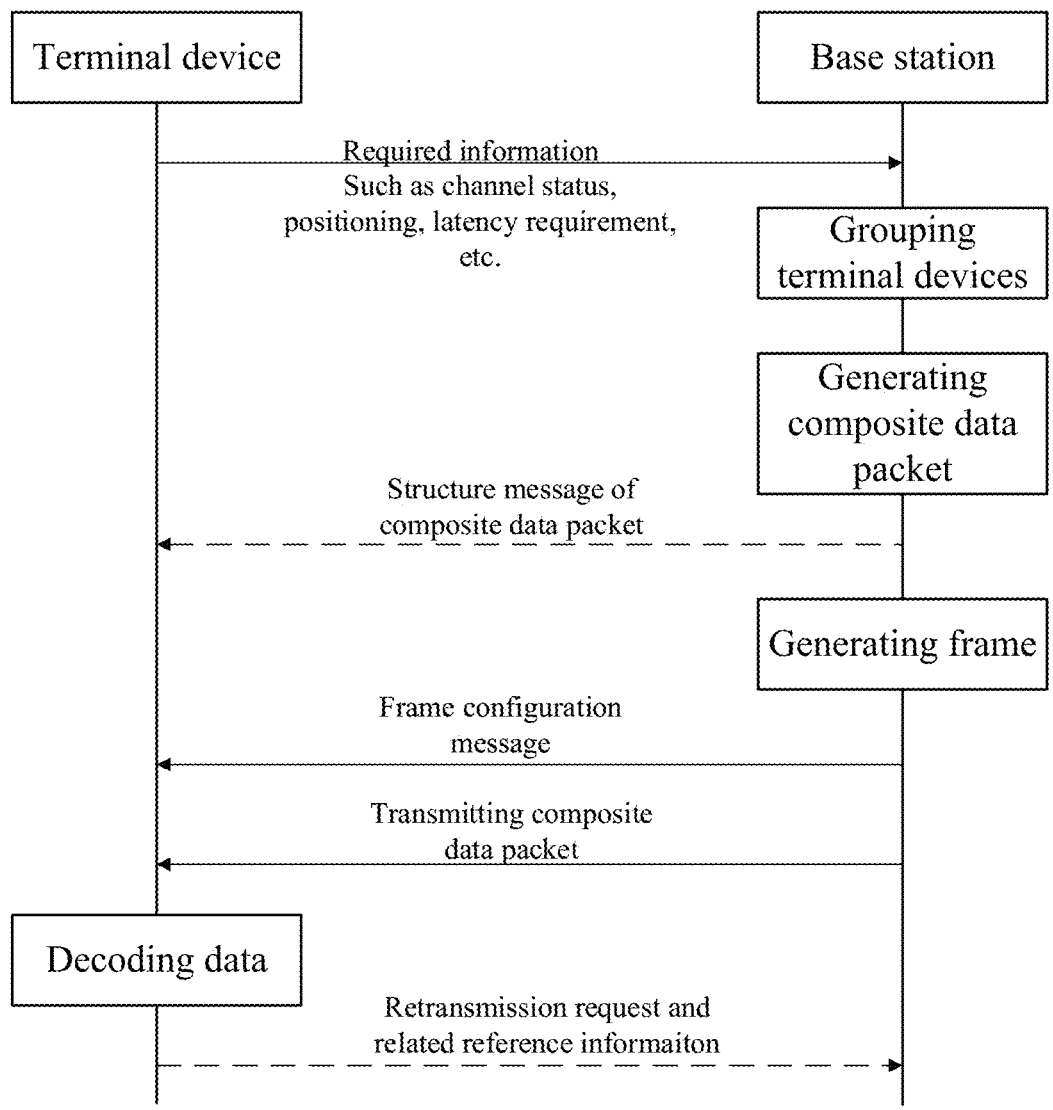
FIG. 13 schematically illustrates signaling interaction between the control device and the terminal device according to an embodiment of the present disclosure.

As shown in FIG. 13, the terminal device first sends related reference information to the base station. The reference information may include data configuration parameter (such as data packet length, latency requirement, reliability requirement, etc.), channel status information (e.g., channel status indicator CQI, etc.), and security requirement information, or the like. It should be noted that these reference information can be obtained by the base station itself, for example, it can be notified to the base station in advance during broadcast communication, or provided to the base station by any other device during the communication process.

After receiving the reference information, the base station groups the terminal devices. As explained in detail above, for example, grouping may be based on the similarity between data configuration parameters of terminal devices as well as the similarity between channel statuses. Subsequently, the base station integrates the data packets for the terminal devices in the same group into a composite data packet according to the grouping result, and generates corresponding structural indicators. For example, as described in detail above, after generating the composite data packet, in a case where the structure indicators need to be sent to the terminal devices separately from the composite data packet, the base station transmits the structure indicators to the terminal device together with scheduling information, for example, via PDCCH.

Subsequently, the base station selects an appropriate frame structure to carry the composite data packet with reference to the corresponding 3GPP standard. After generating the frame, the base station allocates channel resources for the composite data packet based on the channel status and data transmission configuration parameter of the terminal device, and sends the frame structure configuration and channel resource allocation to the terminal device. Specifically, the signaling related to the configuration for transmitting the frame structure and the allocation of channel resources can be decided based on the channel status, data generation configuration parameter (such as data generation period and packet length, etc.) and data transmission configuration parameter (such as reliability requirement and latency requirement, etc.). Subsequently, the base station transmits the composite data packet by using the predetermined frame structure configuration and the allocated resources.

It should be noted that the base station may use a conventional transmission method when transmitting the composite data packet, or perform duplication transmission as described above, thereby further improving reliability.

It should be noted that, as an alternative, as described above, the structure message of the composite data packet may form a frame structure together with the composite data packet and be transmitted together. Alternatively, the structure message of the composite data packet may be sent to the terminal device after the transmission of the composite data packet.

Continue to refer to FIG. 13, after having received the frame transmitted by the base station, the terminal device decodes data therefrom. This process can be divided into three steps, first, the terminal device receives the frame sent by the base station. After that, the terminal device obtains a composite data packet containing the data packet for the user based on the configuration of the frame structure and resource allocation. Finally, the data is decoded based on the composite data packet and structural indicator. As explained above, in the case where the data packet for the terminal data is divided into a plurality of sub-portions, decoding the data may include the step of reconstructing the data packet based on the structure indicator.

It should be noted that in a case where there is an error in the decoded data and retransmission is required, the terminal device may send a retransmission request to the base station, for example, send the retransmission request according to HARQ. The manner of retransmission has been described in detail above. According to different retransmission manners, the structure of the composite data packet may be changed/updated, and the retransmission process will be repeated until the data transmission is completed.

It should be noted that although not explicitly shown in the signaling diagram, the base station can also periodically retransmit data, for example, it can periodically detect the ack message from the terminal device, and if no ack message is received, the data retransmission is carried out as described above.

In addition, it should be noted that although not explicitly shown in the signaling diagram, the terminal device can also provide feedback to the base station to provide relevant information about change, etc., thereby the base station can update the composite data packet for transmission according to the feedback relevant information. Or the base station may update the composite data packet periodically or according to reference information provided by any other device. Such updating may include updating the terminal devices corresponding to the composite data packet and/or updating the division and/or arrangement of data packets for terminal devices in the composite data packet.

Performance Analysis

The specific embodiments according to the present disclosure have been described above with reference to the figures. As explained above, according to the solution of the present disclosure, the latency requirement and the reliability requirement can be satisfied at the same time. Next, Table 3 will explain this.

The reliability at the receiving end is calculated using Formula 3, which represents the reliability at the receiving end by an approximate value of probability Pr of error-free transmission of a single user data packet.

$$P_r \approx 1 - \in^*(k,n) \times k \quad \text{Formula 3}$$

Figure 14:
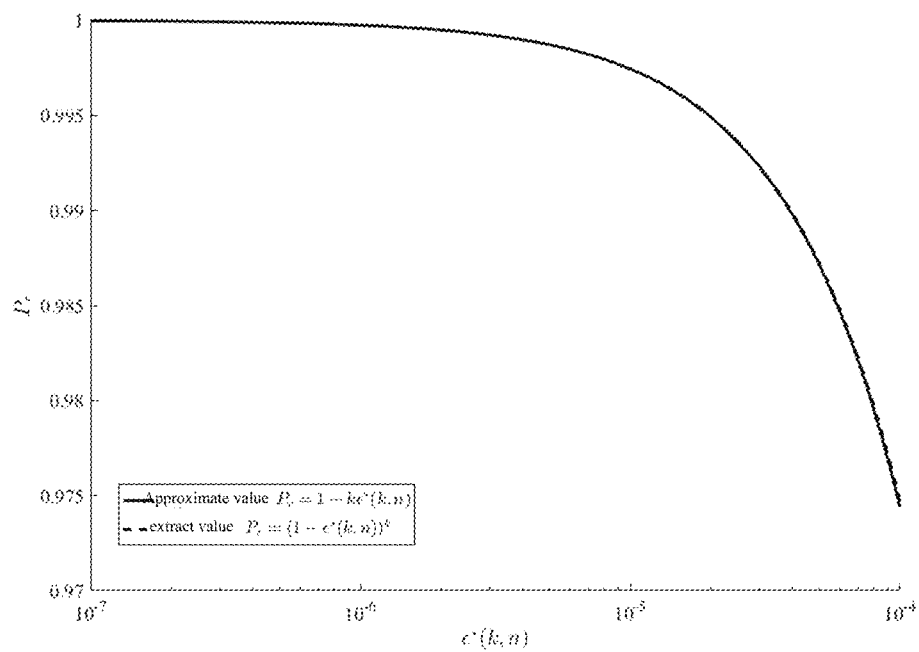
FIG. 14 schematically shows the relationship between an approximate value and an exact value of the probability of error-free transmission of a single data packet.

Among them, $\in^*(k,n)$ is the Formula 1 of the error rate of the user data packet as explained above, k is the number of user packet bits, and n is the number of utilized channels as explained above. It should be noted that although Formula 3 represents the approximate value of the probability Pr of error-free transmission of a single user data packet, the difference between the approximate value and the exact value (represented by Equation 2) of the probability is very small (such as can be seen with reference to FIG. 14), so this approximate value can represent the reliability of the receiving end.

By using various parameters of the composite data packet to calculate Pr, the relationship between latency and reliability can be obtained, as shown in Table 3.

TABLE 3

| Retransmission times | Reliability | Downlink latency (ms) |
|---|---|---|
| 0 | $1 - 1.7 \times 10^{-9}$ | 0.375 |

It can be seen from Table 3 that, according to the solution of the present disclosure, both the downlink latency not exceeding 0.5 ms as specified in URLLC and the reliability being higher than $1-10^{-5}$ can be met simultaneously. It can be seen that the composite data packet according to the present disclosure has good performance, and usage of the composite data packet can satisfy the requirements for latency and reliability simultaneously.

In the present disclosure, machine type communication is described as an example of a URLLC scenario, but it should be understood that the application scenarios of the present disclosure are not limited to machine type communication scenarios, or even URLLC scenarios. The improved solution proposed by the present disclosure can be applied to any application scenario that has high requirements on latency and reliability.

Exemplary Embodiment Implementation of the Present Disclosure

According to the embodiments of the present disclosure, various ways of implementing the concepts of the present disclosure can be thought of, including but not limited to:

Exemplary Embodiment 1. An Electronic Device for a Control-Device-Side of a wireless communication system, comprising:
a processing circuit configured to:
group a plurality of terminal devices based on respective data configuration parameters of the plurality of terminal devices;
for each group, integrate data packets for terminal devices in the group into a composite data packet to be sent to the terminal devices in the group.

Exemplary embodiment 2. The electronic device of Exemplary embodiment 1,
wherein, the processing circuit is further configured to group the terminal devices based on similarity among the data configuration parameters of the terminal devices.

Exemplary embodiment 3. The electronic device of Exemplary embodiment 1,
wherein, the data configuration parameter of a terminal device comprises a data generation configuration parameter of the terminal device, and,
wherein, a difference among the data generation configuration parameters of terminal devices which are grouped into a same group is smaller than a particular threshold.

Exemplary embodiment 4. The electronic device of Exemplary embodiment 3,
wherein, the data generation configuration parameter comprises at least one of a data generation period and a data packet length.

Exemplary embodiment 5. The electronic device of Exemplary embodiment 1, wherein, the data configuration parameter of a terminal device comprises a data transmission configuration parameter, and wherein, terminal devices whose data transmission configuration parameters exceed a particular threshold are not included in a same group.

Exemplary embodiment 6. The electronic device of Exemplary embodiment 5, wherein, the data transmission configuration parameter comprises at least one of a data transmission reliability requirement and a data transmission latency requirement.

Exemplary embodiment 7. The electronic device of Exemplary embodiment 1, wherein, the processing circuit is further configured to group the terminal devices based on channel statuses of the terminal devices, wherein, a difference among the channel statuses of terminal devices being grouped in a same group is smaller than a particular threshold.

Exemplary embodiment 8. The electronic device of any one of Exemplary embodiments 1 to 7, wherein, the composite data packet for a group of terminal devices comprises at least one data packet for at least one terminal device.

Exemplary embodiment 9. The electronic device of any one of Exemplary embodiments 1 to 7, wherein, the processing circuit is further configured to, for each group of terminal devices, divide data packets for at least one of the terminal devices in the group into a plurality of sub-portions, wherein, in the composite data packet for the group, the divided plurality of sub-portions are arranged sequentially or dispersedly.

Exemplary embodiment 10. The electronic device of Exemplary embodiment 9, wherein, a data packet for a terminal device is divided according to at least one of a data transmission configuration parameter and a data security of the terminal device.

Exemplary embodiment 11. The electronic device of any one of Exemplary embodiments 1 to 7, wherein the processing circuit is further configured to:

allocate channel resources for the composite data packet based on the channel statuses and the data transmission configuration parameters of the terminal devices.

Exemplary embodiment 12. The electronic device of any one of Exemplary embodiments 1-7, wherein the processing circuit is further configured to:

send a composite packet structure indicator corresponding to a terminal device to the terminal device, the structure indicator indicating the position and length occupied by the terminal device's data packet or its divided sub-portions in the composite data packet corresponding to the terminal device.

Exemplary embodiment 13. The electronic device of Exemplary embodiment 12, wherein:

the structure indicator is sent together with the corresponding composite data packet, and wherein, the structure indicator sent together with the composite data packet includes the structure indicator for each terminal device in the terminal devices corresponding to the composite data packet.

Exemplary embodiment 14. The electronic device of Exemplary embodiment 12, wherein:

the structure indicator and the composite data packet are separately sent to the corresponding terminal device.

Exemplary embodiment 15. The electronic device of any one of Exemplary embodiments 1 to 7, wherein the processing circuit is further configured to update the composite data packet periodically or in response to feedback from the terminal devices.

Exemplary embodiment 16. The electronic device of Exemplary embodiment 15, wherein, the updating of the composite data packet includes updating of the terminal devices corresponding to the composite data packet and/or updating of the division and/or arrangement of the data packets for the terminal devices in the composite data packet.

Exemplary embodiment 17. The electronic device of any one of Exemplary embodiments 1-7, wherein the processing circuit is further configured to retransmit data periodically or in response to a request from the terminal device.

Exemplary embodiment 18. The electronic device of Exemplary embodiment 17, wherein the data retransmission is performed in one of the following ways:

retransmit the previously generated composite data packet;

retransmit a new composite data packet, which is re-integrated from the data packets related to specific data packets in the previously generated composite data packet;

retransmit specific data packets individually.

Exemplary embodiment 19. The electronic device of Exemplary embodiment 18, wherein in the case of retransmitting a new composite data packet, the terminal device is provided with a structure indicator for the corresponding new composite data packet.

Exemplary embodiment 20. The electronic device of Exemplary embodiment 18, wherein the specific data packets are data packets for terminal devices in the previously generated composite data packet that have not been successfully received.

Exemplary embodiment 21. The electronic device of Exemplary embodiment 17, wherein the data retransmission manner is selected based on at least one of a data transmission configuration parameter of the terminal device and a channel status of the terminal device.

Exemplary embodiment 22. A method for a control-device-side of a wireless communication system, including:

grouping a plurality of terminal devices based on respective data configuration parameters of the plurality of terminal devices;

for each group, integrating data packets for terminal devices in the group into a composite data packet to be sent to the terminal devices in the group.

Exemplary embodiment 23. An electronic device for a terminal-device-side of a wireless communication system, comprising:

a processing circuit configured to:

receive a composite data packet, wherein the composite data packet is formed by integrating data packets for a group of terminal devices including the terminal device which is grouped according to data configuration parameters of the terminal devices;

decode the data for the terminal device from the received composite data packet.

Exemplary embodiment 24. The electronic device of Exemplary embodiment 23, wherein, the terminal devices are grouped based on similarity between the data configuration parameters of the terminal devices.

Exemplary embodiment 25. The electronic device of Exemplary embodiment 23, wherein, the data configuration parameter of the terminal device comprises a data generation configuration parameter of the terminal device, and, wherein, a difference among the data generation configuration parameters of terminal devices which are grouped into a same group is smaller than a particular threshold.

Exemplary embodiment 26. The electronic device of Exemplary embodiment 25, wherein, the data generation configuration parameter comprises at least one of a data generation period and a data packet length.

Exemplary embodiment 27. The electronic device of Exemplary embodiment 23, wherein, the data configuration parameter of the terminal device comprises a data transmission configuration parameter, and wherein, terminal devices whose data transmission configuration parameters exceed a particular threshold are not included in a same group.

Exemplary embodiment 28. The electronic device of Exemplary embodiment 27, wherein, the data transmission configuration parameter comprises at least one of a data transmission reliability requirement and a data transmission latency requirement.

Exemplary embodiment 29. The electronic device of Exemplary embodiment 23, wherein, the terminal devices are grouped based on channel statuses of the terminal devices, and wherein, a difference among the channel statuses of terminal devices being grouped in a same group is smaller than a particular threshold.

Exemplary embodiment 30. The electronic device of any one of Exemplary embodiments 23 to 29, wherein, wherein, the data packet for the terminal device in the composite data packet is divided into a plurality of sub-portions, and wherein, the divided plurality of sub-portions are arranged sequentially or dispersedly.

Exemplary embodiment 31. The electronic device of Exemplary embodiment 30, wherein, the data packet for the terminal device is divided according to at least one of a data transmission configuration parameter and a data security of the terminal device.

Exemplary embodiment 32. The electronic device of any one of Exemplary embodiments 23-29, wherein the processing circuit is further configured to:

receive a composite packet structure indicator corresponding to the terminal device, the structure indicator indicating the position and length occupied by the terminal device's data packet or its divided sub-portions in the composite data packet corresponding to the terminal device.

Exemplary embodiment 33. The electronic device of Exemplary embodiment 32, wherein the structure indicator is sent together with or separate from the corresponding composite data packet.

Exemplary embodiment 34. The electronic device of Exemplary embodiment 32, wherein the processing circuit is further configured to:

reconstruct the data packet according to the structure indicator to decode the data for the terminal device from the received composite data packet.

Exemplary embodiment 35. The electronic device of any one of Exemplary embodiments 23-29, wherein the processing circuit is further configured to receive the composite data packet updated by a control device periodically or in response to a request from the terminal device, and wherein, in the updated composite data packet, the terminal devices corresponding to the composite data packet and/or the division and/or arrangement of the data packets for the terminal devices in the composite data packet are updated.

Exemplary embodiment 36. The electronic device of any one of Exemplary embodiments 23-29, wherein the processing circuit is further configured to receive data retransmitted by a control device periodically or in response to feedback from the terminal device, and wherein, the retransmitted data includes at least one of the following:
  the previously generated composite data packet;
  a new composite data packet, which is re-integrated from the data packets related to specific data packets in the previously generated composite data packet;
  specific data packets in the previously generated composite data packet.

Exemplary embodiment 37. The electronic device of Exemplary embodiment 36, wherein the processing circuit is configured to, when a new composite data packet is received, also receive a corresponding new composite data packet structure indicator.

Exemplary embodiment 38. The electronic device of Exemplary embodiment 36, wherein the specific data packets are data packets for the terminal device in the previous composite data packet that have not been successfully received.

Exemplary embodiment 39. The electronic device of Exemplary embodiment 36, wherein the retransmitted data is selected based on at least one of a data transmission configuration parameter of the terminal device and a channel status of the terminal device.

Exemplary embodiment 40. A method for a terminal-device-side of a wireless communication system, including:

receiving a composite data packet, wherein the composite data packet is formed by integrating data packets for a group of terminal devices including the terminal device which is grouped according to data configuration parameters of the terminal devices;

decoding the data for the terminal device from the received composite data packet.

Exemplary embodiment 41. A non-transitory computer-readable storage medium storing executable instructions that when executed implement the method of Exemplary embodiment 22 or 40.

Exemplary embodiment 42. A device, including:
a processor,
a storage device storing executable instructions that when executed implement the method of Exemplary embodiment 22 or 40.

Exemplary embodiment 43. An apparatus comprising means for implementing the method of Exemplary embodiment 22 or 40.

It should be noted that the application examples described above are merely exemplary. The embodiments of the present disclosure can also be executed in any other suitable manner in the above application examples, and the advantageous effects obtained by the embodiments of the present disclosure still can be achieved. Moreover, the embodiments of the present disclosure can also be applied to other similar application examples, and the advantageous effects obtained by the embodiments of the present disclosure can still be achieved.

It should be understood that the machine-executable instructions in the machine-readable storage medium or program product according to the embodiments of the present disclosure may be configured to perform operations corresponding to the above-mentioned device and method embodiments. When referring to the above device and method embodiments, the embodiments of the machine-readable storage medium or program product are clear to those skilled in the art, and therefore will not be described repeatedly. Machine-readable storage medium and program products for carrying or including the above-mentioned machine-executable instructions also fall within the scope of the present disclosure. Such a storage medium may include, but is not limited to, a floppy disk, an optical disk, a magneto-optical disk, a memory card, a memory stick, and the like.

Figure 15:
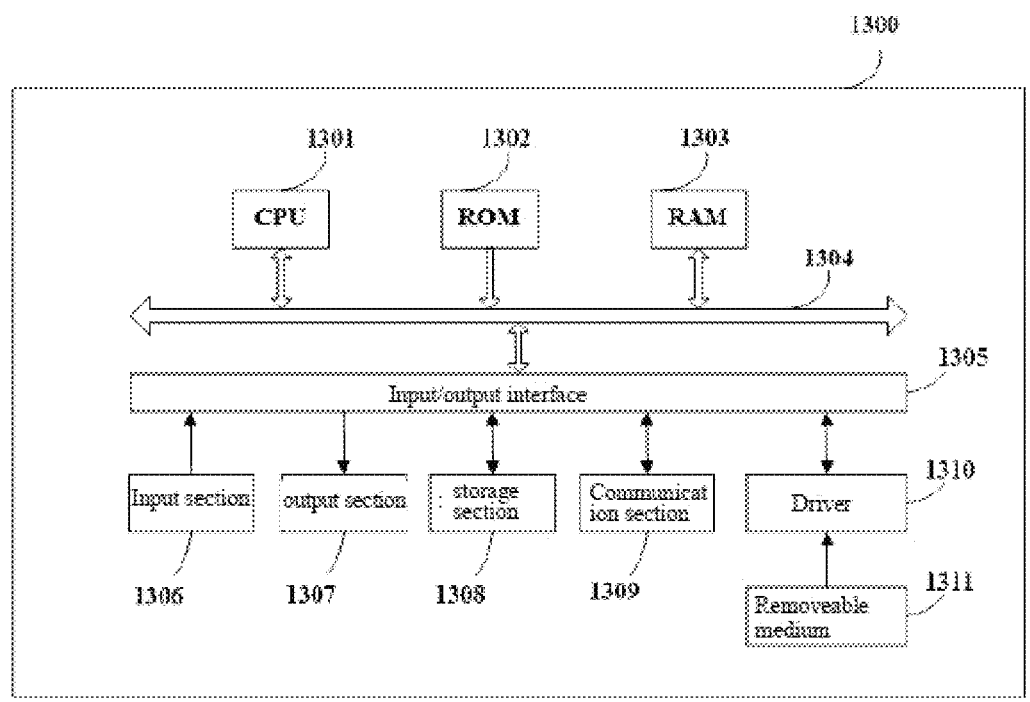
FIG. 15 is a block diagram of an exemplary structure of a personal computer as an information processing device that can be employed in an embodiment of the present disclosure.

In addition, it should be understood that the processes and devices described above may also be implemented by software and/or firmware. When implemented by software and/or firmware, a program constituting the software is installed from a storage medium or a network to a computer having a dedicated hardware structure, such as a general-purpose personal computer 1300 shown in FIG. 15, and the computer can perform a variety of functions by installing various programs thereon. FIG. 15 is a block diagram showing an example structure of a personal computer as an information processing apparatus that can be adopted in an embodiment of the present disclosure. In one example, the personal computer may correspond to the above-described exemplary terminal equipment according to the present disclosure.

In FIG. 15, a central processing unit (CPU) 1301 performs various processes according to a program stored in a read only memory (ROM) 1302 or a program loaded from a storage section 1308 to a random access memory (RAM) 1303. In the RAM 1303, data required when the CPU 1301 executes various processes and the like is also stored as necessary.

The CPU 1301, the ROM 1302, and the RAM 1303 are connected to each other via a bus 1304. An input/output interface 1305 is also connected to the bus 1304.

The following components are connected to the input/output interface 1305: an input section 1306 including a keyboard, a mouse, etc.; an output section 1307 including a display, such as a cathode ray tube (CRT), a liquid crystal display (LCD), etc., and a speaker, etc.; a storage section 1308 including hard disks, etc.; and communication section 1309 including network interface cards such as LAN cards, modems, etc. The communication section 1309 performs communication processing via a network such as the Internet.

A driver 1310 is also connected to the input/output interface 1305 as needed. A removable medium 1311 such as a magnetic disk, an optical disk, a magneto-optical disk, a semiconductor memory, etc. is installed on the drive 1310 as needed, so that a computer program read out therefrom can be installed into the storage section 1308 as needed.

In a case where the above-mentioned processes are realized by a software, the programs constituting the software are installed from a network such as the Internet or a storage medium such as a removable medium 1311.

Those skilled in the art should understand that such a storage medium is not limited to the removable medium 1311 shown in FIG. 15 in which the program is stored, and which is distributed separately from the device to provide the program to the user. Examples of the removable medium 1311 include a magnetic disk (including a floppy disk (registered trademark)), an optical disk (including a CD-ROM and a digital versatile disk (DVD)), and a magneto-optical disk (including a mini disk (MD) (registered trademark)) and semiconductor memory. Alternatively, the storage medium may be the ROM 1302, a hard disk included in the storage portion 1308, and the like, in which programs are stored and which are distributed to users along with the device containing them.

The technology of the present disclosure can be applied to various products.

For example, the electronic device 10 according to the embodiments of the present disclosure can be implemented as a variety of control devices/base stations or included in a variety of control devices/base stations, and the method as shown in FIG. 10 can be implemented by a variety of control devices/base stations. For example, the electronic device 20 according to the embodiments of the present disclosure can be implemented as a variety of terminal devices/user equipments or included in a variety of terminal devices/user equipments, and the method as shown in FIG. 12 can be implemented by a variety of terminal devices/user equipments.

For example, the base stations mentioned in this disclosure can be implemented as any type of evolved Node B (gNB), such as macro gNB and small gNB. A small gNB may be a gNB covering a cell smaller than a macro cell, such as a pico gNB, a micro gNB, and a home (femto) gNB. Alternatively, the base station can be implemented as any other type of base station, such as a NodeB and a Base Transceiver Station (BTS). The base station may include: a main body (also referred to as a base station device) configured to control wireless communication; and one or more remote radio heads (RRHs) disposed at a place different from the main body. In addition, various types of terminals described below can work as base stations by temporarily or semi-persistently performing base station functions.

For example, the terminal equipment mentioned in this disclosure is also referred to as user equipment in some examples, and can be implemented as a mobile terminal such as a smart phone, a tablet personal computer (PC), a notebook PC, a portable gaming terminal, a portable/dongle Mobile routers and digital cameras, or vehicle terminals such as car navigation equipment. User equipment can also be implemented as a terminal that performs machine-to-machine (M2M) communication, also called as a machine type communication (MTC) terminal. In addition, the user equipment may be a wireless communication module mounted on each of the terminals described above, such as an integrated circuit module including a single chip.

Examples according to the present disclosure will be described below with reference to FIGS. 16 to 19.

[Example of Base Station]

It should be understood that the term "base station" in this disclosure has the full breadth of its usual meaning and includes at least a wireless communication station that is used as part of a wireless communication system or radio system for facilitating communication. Examples of base stations may be, for example but not limited to, the following: maybe one or both of a base transceiver station (BTS) and a base station controller (BSC) in a GSM system, may be one or both of a radio network controller (RNC) and Node B in a WCDMA system, may be eNBs in LTE and LTE-Advanced systems, or may be corresponding network nodes in future communication systems (such as gNB, eLTE, eNB, etc. that may appear in 5G communication systems). Part of the functions in the base station of the present disclosure can also be implemented as an entity with control function for communication in D2D, M2M, and V2V communication scenarios, or as an entity that plays a spectrum coordination role in cognitive radio communication scenarios.

First Example

Figure 16:
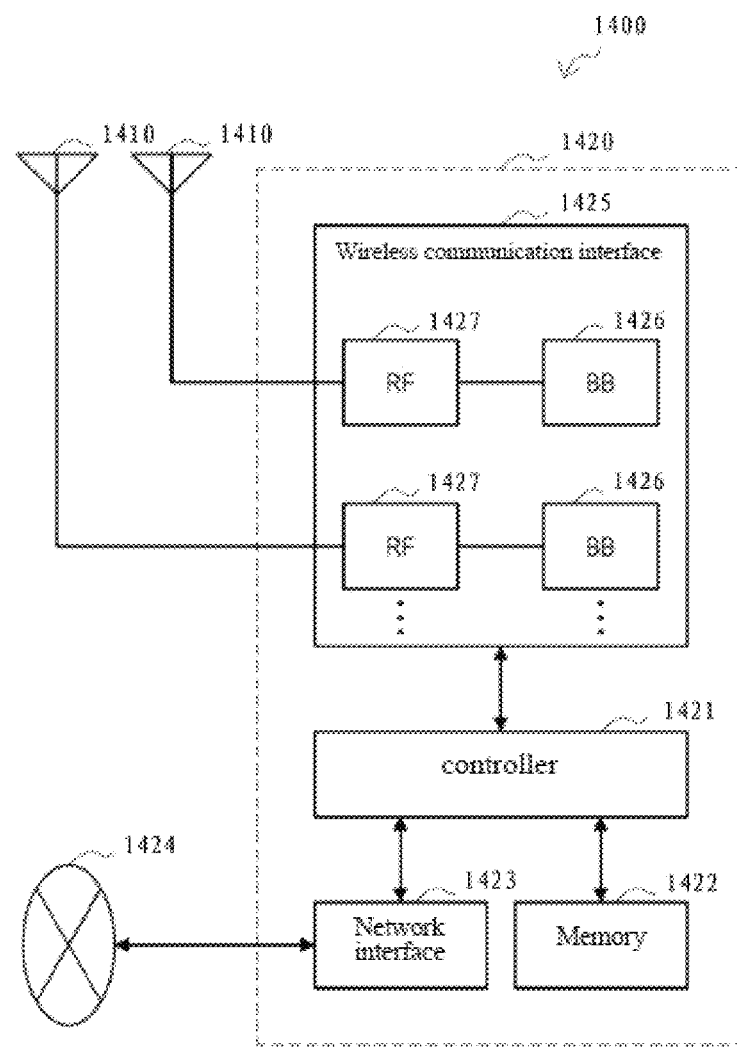
FIG. 16 is a block diagram showing a first example of a schematic configuration of a gNB to which the technology of the present disclosure can be applied.

FIG. 16 is a block diagram showing a first example of a schematic configuration of a gNB to which the technology of the present disclosure can be applied. The gNB 1400 includes a plurality of antennas 1410 and a base station device 1420. The base station device 1420 and each antenna 1410 may be connected to each other via an RF cable. In an implementation manner, the gNB 1400 (or the base station device 1420) herein may correspond to the above-mentioned electronic devices 10, and/or 20.

Each of the antennas 1410 includes a single or multiple antenna elements, such as multiple antenna elements included in a multiple-input multiple-output (MIMO) antenna, and is used for the base station device 1420 to transmit and receive wireless signals. As shown in FIG. 16, the gNB 1400 may include a plurality of antennas 1410. For example, multiple antennas 1410 may be compatible with multiple frequency bands used by gNB 1400.

The base station device 1420 includes a controller 1421, a memory 1422, a network interface 1423, and a wireless communication interface 1425.

The controller 1421 may be, for example, a CPU or a DSP, and operates various functions of the base station device 1420 at a higher layer. For example, the controller 1421 generates data packets based on data in signals processed by the wireless communication interface 1425, and passes the generated packets via the network interface 1423. The controller 1421 may bundle data from multiple baseband processors to generate bundled packets, and pass the generated bundled packets. The controller 1421 may have logical functions that perform controls such as radio resource control, radio bearer control, mobility management, admission control, and scheduling. The controls can be performed in conjunction with a nearby gNB or core network node. The memory 1422 includes a RAM and a ROM, and stores a program executed by the controller 1421 and various types of control data such as a terminal list, transmission power data, and scheduling data.

The network interface 1423 is a communication interface for connecting the base station device 1420 to the core network 1424. The controller 1421 may communicate with a core network node or another gNB via the network interface 1423. In this case, the gNB 1400 and the core network node or other gNBs may be connected to each other through a logical interface such as an Si interface and an X2 interface. The network interface 1423 may also be a wired communication interface or a wireless communication interface for a wireless backhaul line. If the network interface 1423 is a wireless communication interface, compared with the frequency band used by the wireless communication interface 1425, the network interface 1423 can use a higher frequency band for wireless communication.

The wireless communication interface 1425 supports any cellular communication scheme such as Long Term Evolution (LTE) and LTE-Advanced, and provides a wireless connection to a terminal located in a cell of the gNB 1400 via an antenna 1410. The wireless communication interface 1425 may generally include, for example, a baseband (BB) processor 1426 and an RF circuit 1427. The BB processor 1426 may perform, for example, encoding/decoding, modulation/demodulation, and multiplexing/demultiplexing, and execute various types of signal processing in layers such as L1, Medium Access Control (MAC), Radio Link Control (RLC), and Packet Data Convergence Protocol (PDCP). As an alternative of the controller 1421, the BB processor 1426 may have a part or all of the above-mentioned logical functions. The BB processor 1426 may be a memory storing a communication control program, or a module including a processor and related circuits configured to execute the program. Updating the program can change the function of the BB processor 1426. The module may be a card or a blade inserted into a slot of the base station device 1420. Alternatively, the module may be a chip mounted on a card or a blade. Meanwhile, the RF circuit 1427 may include, for example, a mixer, a filter, and an amplifier, and transmits and receives a wireless signal via the antenna 1410. Although FIG. 16 illustrates an example in which one RF circuit 1427 is connected to one antenna 1410, the present disclosure is not limited to this illustration, but one RF circuit 1427 may be connected to multiple antennas 1410 at the same time.

As shown in FIG. 16, the wireless communication interface 1425 may include a plurality of BB processors 1426. For example, the plurality of BB processors 1426 may be compatible with multiple frequency bands used by gNB 1400. As shown in FIG. 16, the wireless communication interface 1425 may include a plurality of RF circuits 1427. For example, the plurality of RF circuits 1427 may be compatible with multiple antenna elements. Although FIG. 16 shows an example in which the wireless communication interface 1425 includes a plurality of BB processors 1426 and a plurality of RF circuits 1427, the wireless communication interface 1425 may also include a single BB processor 1426 or a single RF circuit 1427.

Second Example

Figure 17:
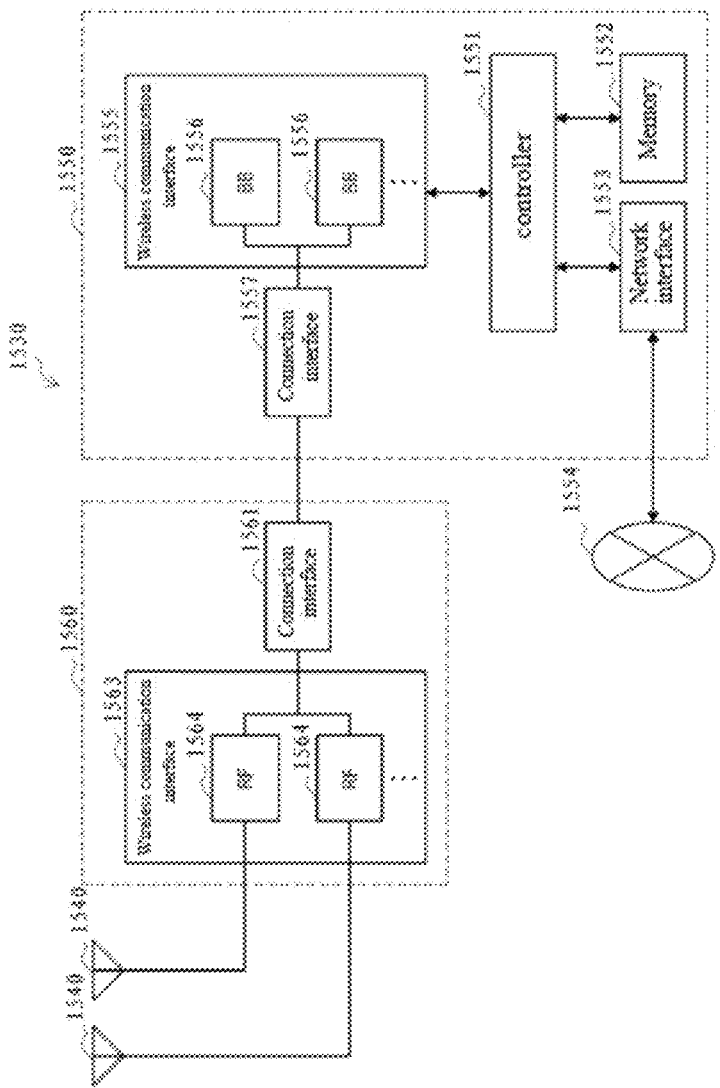
FIG. 17 is a block diagram showing a second example of a schematic configuration of a gNB to which the technology of the present disclosure can be applied.

FIG. 17 is a block diagram showing a second example of a schematic configuration of a gNB to which the technology of the present disclosure can be applied. The gNB 1530 includes multiple antennas 1540, base station equipment 1550, and RRH 1560. The RRH 1560 and each antenna 1540 may be connected to each other via an RF cable. The base station equipment 1550 and the RRH 1560 may be connected to each other via a high-speed line such as a fiber optic cable. In an implementation manner, the gNB 1530 (or the base station device 1550) herein may correspond to the foregoing electronic devices 10, and/or 20.

Each of the antennas 1540 includes a single or multiple antenna elements (such as multiple antenna elements included in a MIMO antenna) and is used for RRH 1560 to transmit and receive wireless signals. As shown in FIG. 17, the gNB 1530 may include multiple antennas 1540. For example, multiple antennas 1540 may be compatible with multiple frequency bands used by gNB 1530.

The base station device 1550 includes a controller 1551, a memory 1552, a network interface 1553, a wireless communication interface 1555, and a connection interface 1557. The controller 1551, the memory 1552, and the network interface 1553 are the same as the controller 1421, the memory 1422, and the network interface 1423 described with reference to FIG. 16.

The wireless communication interface 1555 supports any cellular communication scheme such as LTE and LTE-Advanced, and provides wireless communication to a terminal located in a sector corresponding to the RRH 1560 via the RRH 1560 and the antenna 1540. The wireless communication interface 1555 may typically include, for example, a BB processor 1556. The BB processor 1556 is the same as the BB processor 1426 described with reference to FIG. 16 except that the BB processor 1556 is connected to the RF circuit 1564 of the RRH 1560 via the connection interface 1557. As shown in FIG. 17, the wireless communication interface 1555 may include a plurality of BB processors 1556. For example, multiple BB processors 1556 may be compatible with multiple frequency bands used by gNB 1530. Although FIG. 17 shows an example in which the wireless communication interface 1555 includes a plurality of BB processors 1556, the wireless communication interface 1555 may also include a single BB processor 1556.

The connection interface 1557 is an interface for connecting the base station device 1550 (wireless communication interface 1555) to the RRH 1560. The connection interface 1557 may also be a communication module for communication in the above-mentioned high-speed line connecting the base station device 1550 (wireless communication interface 1555) to the RRH 1560.

The RRH 1560 includes a connection interface 1561 and a wireless communication interface 1563.

The connection interface 1561 is an interface for connecting the RRH 1560 (wireless communication interface 1563) to the base station device 1550. The connection interface 1561 may also be a communication module for communication in the above-mentioned high-speed line.

The wireless communication interface 1563 transmits and receives wireless signals via the antenna 1540. The wireless communication interface 1563 may generally include, for example, an RF circuit 1564. The RF circuit 1564 may include, for example, a mixer, a filter, and an amplifier, and transmits and receives wireless signals via the antenna 1540. Although FIG. 17 illustrates an example in which one RF circuit 1564 is connected to one antenna 1540, the present disclosure is not limited to this illustration, but one RF circuit 1564 may be connected to multiple antennas 1540 at the same time.

As shown in FIG. 17, the wireless communication interface 1563 may include a plurality of RF circuits 1564. For example, the plurality of RF circuits 1564 may support multiple antenna elements. Although FIG. 17 shows an example in which the wireless communication interface 1563 includes a plurality of RF circuits 1564, the wireless communication interface 1563 may include a single RF circuit 1564.

[Example of User Equipment]

First Example

Figure 18:
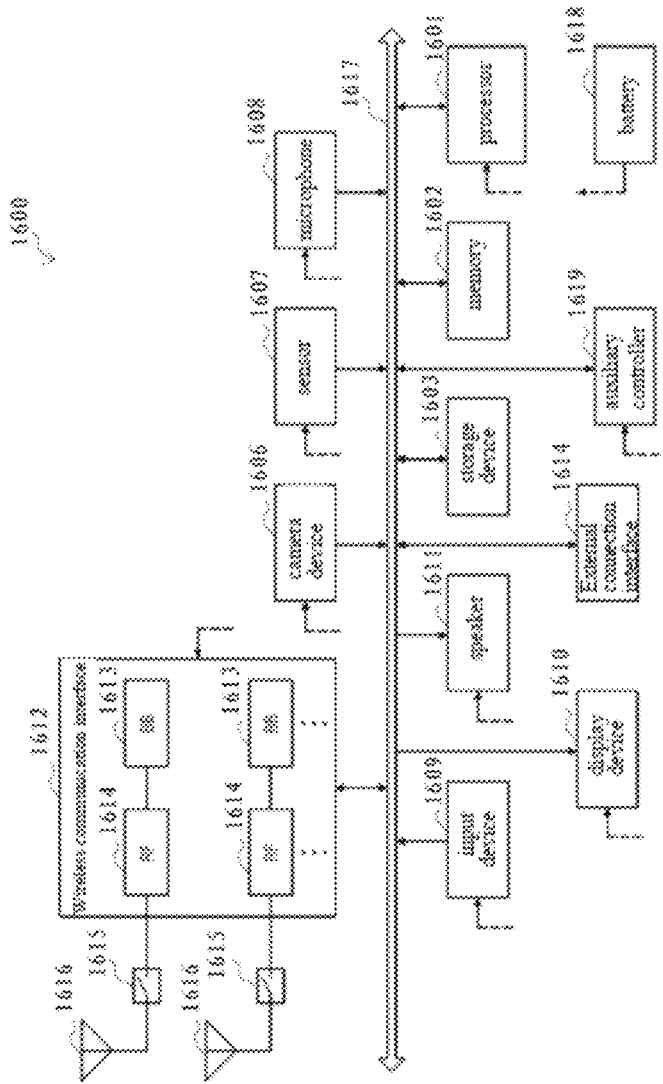
FIG. 18 is a block diagram showing an example of a schematic configuration of a smartphone to which the technology of the present disclosure can be applied.

FIG. 18 is a block diagram showing an example of a schematic configuration of a smartphone 1600 to which the technology of the present disclosure can be applied. The smartphone 1600 includes a processor 1601, a memory 1602, a storage device 1603, an external connection interface 1604, a camera device 1606, a sensor 1607, a microphone 1608, an input device 1609, a display device 1610, a speaker 1611, a wireless communication interface 1612, one or more antenna switches 1615, one or more antennas 1616, a bus 1617, a battery 1618, and an auxiliary controller 1619. In an implementation manner, the smart phone 1600 (or the processor 1601) herein may correspond to the foregoing terminal equipment 300B and/or 1500A.

The processor 1601 may be, for example, a CPU or a system on chip (SoC), and controls functions of an application layer and another layer of the smartphone 1600. The memory 1602 includes a RAM and a ROM, and stores data and programs executed by the processor 1601. The storage device 1603 may include a storage medium such as a semiconductor memory and a hard disk. The external connection interface 1604 is an interface for connecting external devices such as a memory card and a universal serial bus (USB) device to the smartphone 1600.

The camera device 1606 includes an image sensor such as a charge-coupled device (CCD) and a complementary metal oxide semiconductor (CMOS), and generates a captured image. The sensor 1607 may include a set of sensors such as a measurement sensor, a gyroscope sensor, a geomagnetic sensor, and an acceleration sensor. The microphone 1608 converts a sound input to the smartphone 1600 into an audio signal. The input device 1609 includes, for example, a touch sensor, a keypad, a keyboard, a button, or a switch configured to detect a touch on the screen of the display device 1610, and receives an operation or information input from a user. The display device 1610 includes a screen such as a liquid crystal display (LCD) and an organic light emitting diode (OLED) display, and displays an output image of the smartphone 1600. The speaker 1611 converts an audio signal output from the smartphone 1600 into a sound.

The wireless communication interface 1612 supports any cellular communication scheme such as LTE and LTE-Advanced, and performs wireless communication. The wireless communication interface 1612 may generally include, for example, a BB processor 1613 and an RF circuit 1614. The BB processor 1613 may perform, for example, encoding/decoding, modulation/demodulation, and multiplexing/demultiplexing, and perform various types of signal processing for wireless communication. Meanwhile, the RF circuit 1614 may include, for example, a mixer, a filter, and an amplifier, and transmits and receives wireless signals via the antenna 1616. The wireless communication interface 1612 may be a chip module on which a BB processor 1613 and an RF circuit 1614 are integrated. As shown in FIG. 18, the wireless communication interface 1612 may include multiple BB processors 1613 and multiple RF circuits 1614. Although FIG. 18 illustrates an example in which the wireless communication interface 1612 includes a plurality of BB processors 1613 and a plurality of RF circuits 1614, the wireless communication interface 1612 may also include a single BB processor 1613 or a single RF circuit 1614.

In addition, in addition to the cellular communication scheme, the wireless communication interface 1612 may support other types of wireless communication scheme, such as a short-range wireless communication scheme, a near field communication scheme, and a wireless local area network (LAN) scheme. In this case, the wireless communication interface 1612 may include a BB processor 1613 and an RF circuit 1614 for each wireless communication scheme.

Each of the antenna switches 1615 switches a connection destination of the antenna 1616 between a plurality of circuits included in the wireless communication interface 1612 (for example, circuits for different wireless communication schemes).

Each of the antennas 1616 includes a single or multiple antenna elements, such as multiple antenna elements included in a MIMO antenna, and is used for the wireless communication interface 1612 to transmit and receive wireless signals. As shown in FIG. 18, the smartphone 1600 may include a plurality of antennas 1616. Although FIG. 18 illustrates an example in which the smart phone 1600 includes a plurality of antennas 1616, the smart phone 1600 may also include a single antenna 1616.

In addition, the smartphone 1600 may include an antenna 1616 for each wireless communication scheme. In this case, the antenna switch 1615 may be omitted from the configuration of the smartphone 1600.

The bus 1617 connects the processor 1601, the memory 1602, the storage device 1603, the external connection interface 1604, the camera device 1606, the sensor 1607, the microphone 1608, the input device 1609, the display device 1610, the speaker 1611, the wireless communication interface 1612, and the auxiliary controller 1619 to each other. The battery 1618 supplies power to each block of the smartphone 1600 shown in FIG. 18 via a feeder, and the feeder is partially shown as a dotted line in the figure. The auxiliary controller 1619 operates the minimum necessary functions of the smartphone 1600 in the sleep mode, for example.

Second Example

Figure 19:
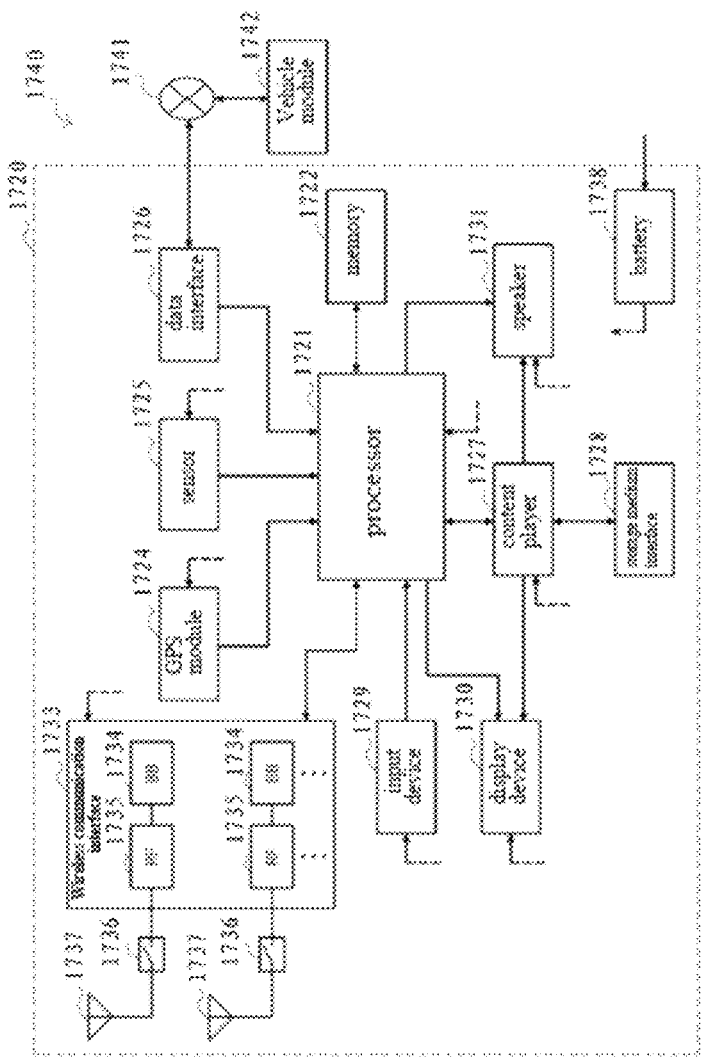
FIG. 19 is a block diagram showing an example of a schematic configuration of a car navigation device to which the technology of the present disclosure can be applied.

FIG. 19 is a block diagram showing an example of a schematic configuration of a car navigation device 1720 to which the technology of the present disclosure can be applied. The car navigation device 1720 includes a processor 1721, a memory 1722, a global positioning system (GPS) module 1724, a sensor 1725, a data interface 1726, a content player 1727, a storage medium interface 1728, an input device 1729, a display device 1730, a speaker 1731, and a wireless communication interface 1733, one or more antenna switches 1736, one or more antennas 1737, and a battery 1738. In an implementation manner, the car navigation device 1720 (or the processor 1721) herein may correspond to the terminal equipment 300B and/or 1500A described above.

The processor 1721 may be, for example, a CPU or a SoC, and controls navigation functions and other functions of the car navigation device 1720. The memory 1722 includes a RAM and a ROM, and stores data and programs executed by the processor 1721.

The GPS module 1724 uses a GPS signal received from a GPS satellite to measure the position (such as latitude, longitude, and altitude) of the car navigation device 1720. The sensor 1725 may include a set of sensors such as a gyroscope sensor, a geomagnetic sensor, and an air pressure sensor. The data interface 1726 is connected to, for example, an in-vehicle network 1741 via a terminal not shown, and acquires data (such as vehicle speed data) generated by the vehicle.

The content player 1727 reproduces content stored in a storage medium such as a CD and a DVD, which is inserted into the storage medium interface 1728. The input device 1729 includes, for example, a touch sensor, a button, or a switch configured to detect a touch on the screen of the display device 1730, and receives an operation or information input from a user. The display device 1730 includes a screen such as an LCD or OLED display, and displays an image of a navigation function or reproduced content. The speaker 1731 outputs the sound of the navigation function or the reproduced content.

The wireless communication interface 1733 supports any cellular communication scheme such as LTE and LTE-Advanced, and performs wireless communication. The wireless communication interface 1733 may generally include, for example, a BB processor 1734 and an RF circuit 1735. The BB processor 1734 may perform, for example, encoding/decoding, modulation/demodulation, and multiplexing/demultiplexing, and perform various types of signal processing for wireless communication. Meanwhile, the RF circuit 1735 may include, for example, a mixer, a filter, and an amplifier, and transmit and receive wireless signals via the antenna 1737. The wireless communication interface 1733 may also be a chip module on which a BB processor 1734 and an RF circuit 1735 are integrated. As shown in FIG. 19, the wireless communication interface 1733 may include a plurality of BB processors 1734 and a plurality of RF circuits 1735. Although FIG. 19 shows an example in which the wireless communication interface 1733 includes a plurality of BB processors 1734 and a plurality of RF circuits 1735, the wireless communication interface 1733 may also include a single BB processor 1734 or a single RF circuit 1735.

In addition, in addition to the cellular communication scheme, the wireless communication interface 1733 may support other types of wireless communication scheme, such as a short-range wireless communication scheme, a near field communication scheme, and a wireless LAN scheme. In this case, the wireless communication interface 1733 may include a BB processor 1734 and an RF circuit 1735 for each wireless communication scheme.

Each of the antenna switches 1736 switches the connection destination of the antenna 1737 between a plurality of circuits included in the wireless communication interface 1733, such as circuits for different wireless communication schemes.

Each of the antennas 1737 includes a single or multiple antenna elements, such as multiple antenna elements included in a MIMO antenna, and is used for the wireless communication interface 1733 to transmit and receive wireless signals. As shown in FIG. 19, the car navigation device 1720 may include a plurality of antennas 1737. Although FIG. 19 shows an example in which the car navigation device 1720 includes a plurality of antennas 1737, the car navigation device 1720 may also include a single antenna 1737.

In addition, the car navigation device 1720 may include an antenna 1737 for each wireless communication scheme. In this case, the antenna switch 1736 may be omitted from the configuration of the car navigation device 1720.

The battery 1738 supplies power to each block of the car navigation device 1720 shown in FIG. 19 via a feeder, and the feeder is partially shown as a dotted line in the figure. The battery 1738 accumulates power provided from the vehicle.

The technology of the present disclosure may also be implemented as a vehicle on-board system (or vehicle) 1740 including one or more of a car navigation device 1720, an in-vehicle network 1741, and a vehicle module 1742. The vehicle module 1742 generates vehicle data such as vehicle speed, engine speed, and failure information, and outputs the generated data to the in-vehicle network 1741.

The exemplary embodiments of the present disclosure have been described above with reference to the accompanying drawings, but the present disclosure is of course not limited to the above examples. A person skilled in the art may find various alternations and modifications within the scope of the appended claims, and it should be understood that they will naturally fall in the technical scope of the present disclosure.

It should be understood that the machine-executable instructions in the machine-readable storage medium or program product according to the embodiments of the present disclosure may be configured to perform operations corresponding to the above-mentioned device and method embodiments. When referring to the above device and method embodiments, the embodiments of the machine-readable storage medium or program product are clear to those skilled in the art, and therefore will not be described repeatedly. Machine-readable storage medium and program products for carrying or including the above-mentioned machine-executable instructions also fall within the scope of the present disclosure. Such a storage medium may include, but is not limited to, a floppy disk, an optical disk, a magneto-optical disk, a memory card, a memory stick, and the like.

In addition, it should be understood that the processes and devices described above may also be implemented by software and/or firmware. When implemented by software and/or firmware, a corresponding program constituting the corresponding software is stored on a storage medium of a related device (such as, memory 101 or 201 of the electronic device 10 as shown in FIG. 5 and the electronic device 20 as shown in FIG. 11), and when executed, can perform a variety of functions.

For example, a plurality of functions included in one unit in the above embodiments may be implemented by separate devices. Alternatively, multiple functions implemented by multiple units in the above embodiments may be implemented by separate devices, respectively. In addition, one of the above functions may be implemented by multiple units. Needless to say, such configurations are included in the technical scope of the present disclosure.

In this specification, the steps described in the flowchart include not only processes performed in time series in the described order, but also processes performed in parallel or individually instead of having to be performed in time series. Further, even in the steps processed in a time series, needless to say, the order can be appropriately changed.

Although the present disclosure and its advantages have been described in detail, it should be understood that various changes, substitutions and alterations can be made hereto without departing from the spirit and scope of the present disclosure as defined by the appended claims. Furthermore, the terms "including", "comprising", or any other variation thereof, of the embodiments of the present disclosure are intended to encompass non-exclusive inclusion, such that a process, method, article, or device that includes a series of elements includes not only those elements, but also includes other elements not explicitly listed, or those inherent in the process, method, article, or equipment. Without more restrictions, the elements defined by the sentence "including a . . . " do not exclude the existence of other identical elements in the process, method, article, or equipment including the elements.

What is claimed is:

1. An electronic device for a control-device-side of a wireless communication system, comprising:
   a processing circuit configured to:
   group a plurality of terminal devices based on respective data configuration parameters of the plurality of terminal devices;
   integrate data packets for each terminal of the plurality of terminal devices in the group into a composite data packet; and
   transmit the composite data packet to the plurality of terminal devices in the group,
   wherein the processing circuit is further configured to transmit a terminal-specific composite packet structure indicator to each of the plurality of terminal devices, the terminal-specific composite packet structure indicator indicating a position and a length occupied by a corresponding terminal device's data packet in the composite data packet or occupied by divided sub-portions of the corresponding terminal device's data packet in the composite data packet,
   wherein the terminal-specific composite packet structure indicator is transmitted together with or separate from the composite data packet,
   Wherein the processing circuit is further configured to retransmit the composite data packet periodically or in response to a request from at least one of the plurality of terminal devices,
   wherein the processing circuit is further configured to retransmit the composite data packet in one of a set of predetermined data retransmission manners, the set of predetermined data retransmission manners comprising:
      retransmitting the previously generated composite data packet in its entirety; or
      transmitting a new composite data packet that only includes specific data packets in the previously generated composite data packet that have not been successfully received, the transmitting the new composite data packet including transmitting a terminal-specific composite packet structure indicator for the new composite data packet; or
      retransmitting only specific data packets, of the previously generated composite data packet, that have not been successfully received, without integration into any composite data packet,
   wherein the processing circuit is further configured to select the data retransmission manner from the set of predetermined data retransmission manners based on each of a terminal device-specific data transmission configuration parameter and a channel status of a terminal device that has not successfully received at least one data packet in the composite data packet.

2. The electronic device of claim 1, wherein the processing circuit is further configured to group the plurality of terminal devices based on similarity among the data configuration parameters of the plurality of terminal devices.

3. The electronic device of claim 1,
   wherein the data configuration parameters of each of the plurality of terminal devices comprises a terminal device-specific data generation configuration parameter,
   wherein the terminal device-specific data generation configuration parameter comprises each of a data generation period and a data packet length, and,
   wherein differences among the terminal device-specific data generation configuration parameters are smaller than a predetermined data generation configuration parameter threshold.

4. The electronic device of claim 1,
   wherein the data configuration parameters of each of the plurality of terminal devices comprises a terminal device-specific data generation configuration parameter,
   wherein the terminal device-specific data transmission configuration parameter comprises each of a data transmission reliability requirement and a data transmission latency requirement, and
   wherein differences among the terminal device-specific data generation configuration parameters are smaller than a predetermined data generation configuration parameter threshold.

5. The electronic device of claim 1,
   wherein the processing circuit is further configured to group the plurality of terminal devices based on channel statuses of the plurality of terminal devices, wherein a difference among the channel statuses of the plurality of terminal devices is smaller than a particular channel status threshold.

6. The electronic device of claim 5, wherein the processing circuit is further configured to:
allocate channel resources for the composite data packet based on the channel statuses and the data configuration parameters of the plurality of terminal devices.

7. The electronic device of claim 1, wherein
the processing circuit is further configured to divide the data packets for a terminal device of the plurality of terminal devices in the group into a plurality of sub-portions, according to each of a data transmission configuration parameter and a data security of the terminal device,
wherein the plurality of sub-portions are arranged sequentially or dispersedly the composite data packet.

8. The electronic device of claim 1, wherein
the processing circuit is further configured to transmit an update to the composite data packet periodically air in response to feedback from at least one of the plurality of terminal devices,
wherein the updated composite data packet includes at least one of:
an update to the plurality of terminal devices within the group, or
an update of at least one of a division or an arrangement of the data packets within the composite data packet.

9. A method for an electronic device for a control-device-side of a wireless communication system, the method comprising:
grouping a plurality of terminal devices based on respective data configuration parameters of the plurality of terminal devices;
integrating data packets for each terminal of the plurality of terminal devices in the group into a composite data packet; and
transmitting the composite data packet to the plurality of terminal devices in the group,
wherein the method further comprises transmitting a terminal-specific composite packet structure indicator to each of the plurality of terminal devices, the terminal-specific composite packet structure indicator indicating a position and a length occupied by a corresponding terminal device's data packet in the composite data packet or occupied by divided sub-portions of the corresponding terminal device's data packet in the composite data packet,
wherein the terminal-specific composite packet structure indicator is transmitted together with or separate from the composite data packet,
wherein the method further comprises retransmitting the composite data packet periodically or in response to a request from at least one of the plurality of terminal devices,
wherein the retransmitting comprises retransmitting the composite data packet in one of a set of predetermined data retransmission manners, the set of predetermined data retransmission manners comprising:
retransmitting the previously generated composite data packet in its entirety; Or
transmitting a new composite data packet that only includes specific data packets in the previously generated composite data packet that have not been successfully received, the transmitting the new composite data packet including transmitting a terminal-specific composite packet structure indicator for the new composite data packet; or
retransmitting only specific data packets, of the previously generated composite data packet, that have not been successfully received, without integration into any composite data packet,
wherein the retransmitting comprises selecting the data retransmission manner from the set of predetermined data retransmission manners based on each of a terminal device-specific data transmission configuration parameter and a channel status of a terminal device that has not successfully received at least one data packet in the composite data packet.

10. An electronic device for a terminal-device-side of a wireless communication system, comprising:
a processing circuit configured to:
receive a composite data packet,
wherein the composite data packet is formed by integrating data packets for a plurality of terminal devices including the electronic device, the plurality of terminal devices being grouped according to data configuration parameters of the plurality of terminal devices;
decode a data packet of the electronic device included in the received composite data packet,
wherein the processing circuit is further configured to receive a terminal-specific composite packet structure indicator, the terminal-specific composite packet structure indicator indicating a position and a length occupied by the data packet of the electronic device in the composite data packet or occupied by divided sub-portions of the data packet of the electronic device in the composite data packet,
wherein the terminal-specific composite packet structure indicator is received together with or separate from the composite data packet,
wherein the processing circuit is further configured to receive a retransmission of the composite data packet periodically or in response to a request from the electronic device,
wherein the retransmission of the composite data packet is received in one of a set of predetermined data retransmission manners, the set of predetermined data retransmission manners comprising:
a retransmission of the previously generated composite data packet in its entirety; or
a transmission of a new composite data packet that only includes specific data packets in the previously generated composite data packet that have not been successfully received, the transmission of the new composite data packet including a transmission of a terminal-specific composite packet structure indicator for the new composite data packet; or
a retransmission of only specific data packets, of the previously generated composite data packet, that have not been successfully received, without integration into any composite data packet,
wherein the data retransmission manner is selected from the set of predetermined data retransmission manners based on each a terminal device-specific data transmission configuration parameter and a channel status of the electronic device when the electronic device has not successfully received at least one data packet in the composite data packet.

11. The electronic device of claim 10, wherein the processing circuit is further configured to:
    reconstruct the divided sub-portions of data packet according to the terminal-specific composite packet structure indicator to decode the data packet.

12. The electronic device of claim 10, wherein
    the processing circuit is further configured to receive an update to the composite data packet periodically or in response to a request from the electronic device, and
    wherein the updated composite data packet includes at least one of:
        an update to the plurality of terminal devices corresponding to the composite data packet, or
        an update of at least one of a division or an arrangement of the data packets for the electronic device within the composite data packet.

\* \* \* \* \*